(12) United States Patent
Hainz et al.

(10) Patent No.: US 10,677,615 B2
(45) Date of Patent: Jun. 9, 2020

(54) PULSE WIDTH MODULATION WITH TWO OR MORE DIFFERENT THRESHOLD LEVELS

(71) Applicant: Infineon Technologies AG, Neubiberg (DE)

(72) Inventors: Simon Hainz, Villach (AT); Lorenzo Coceani, Villach (AT); Tobias Werth, Villach (AT)

(73) Assignee: Infineon Technologies AG, Neubiberg (DE)

( * ) Notice: Subject to any disclaimer, the term of this patent is extended or adjusted under 35 U.S.C. 154(b) by 224 days.

(21) Appl. No.: 15/643,073

(22) Filed: Jul. 6, 2017

(65) Prior Publication Data

US 2019/0011292 A1    Jan. 10, 2019

(51) Int. Cl.
    *G01D 5/249* (2006.01)
    *G08C 19/22* (2006.01)
    *G01P 3/489* (2006.01)
    *G01P 3/487* (2006.01)
    *G01D 21/00* (2006.01)
    *G01D 5/244* (2006.01)

(52) U.S. Cl.
    CPC ............. *G01D 5/249* (2013.01); *G01P 3/487* (2013.01); *G01P 3/489* (2013.01); *G08C 19/22* (2013.01); *G01D 5/244* (2013.01); *G01D 21/00* (2013.01)

(58) Field of Classification Search
    None
    See application file for complete search history.

(56) References Cited

U.S. PATENT DOCUMENTS 6,339,322 B1    1/2002    Loreck et al.
6,542,847 B1    4/2003    Lohberg et al.
(Continued)

FOREIGN PATENT DOCUMENTS

DE    196 34 714    3/1998
DE    196 34 715    3/1998
DE    199 11 774    2/1999

OTHER PUBLICATIONS

Daimler Chrysler, "Requirement Specifications for Standardized Interface for Wheel Speed Sensors with Additional Information: Version 2.0 (English)," 31 pages.

*Primary Examiner* — Nasima Monsur
(74) *Attorney, Agent, or Firm* — Harrity & Harrity, LLP

(57) ABSTRACT

A magnetic sensor may determine information, associated with a magnet wheel, that is associated with a rotational speed of the magnet wheel or a rotational direction of the magnet wheel. The magnetic sensor may determine information, associated with the magnetic sensor, that is associated with a property of the magnetic sensor. The magnetic sensor may provide a signal including the information associated with the magnet wheel and the information associated with the magnetic sensor. The signal may be provided using a pulse width modulation technique associated with at least three signal levels and at least two signal thresholds. A period of time during which the information associated with the magnetic sensor is provided may at least partially overlap a period of time during which the information associated with the magnet wheel is provided, or may be provided without a time offset from the information associated with the magnet wheel.

20 Claims, 15 Drawing Sheets

(56) References Cited

U.S. PATENT DOCUMENTS

| | | | | |
|---|---|---|---|---|
| 8,624,588 B2* | 1/2014 | Vig | ............... | G01P 3/488 |
| | | | | 324/173 |
| 2009/0278711 A1* | 11/2009 | Lohberg | ............. | G01D 5/145 |
| | | | | 341/11 |
| 2012/0092000 A1* | 4/2012 | Lohberg | ............. | G01D 5/24438 |
| | | | | 324/173 |
| 2016/0154045 A1* | 6/2016 | Alcouffe | ............. | G01R 31/007 |
| | | | | 324/750.3 |
| 2018/0067174 A1* | 3/2018 | Prentice | ............. | G01R 33/07 |

* cited by examiner

PULSE WIDTH MODULATION WITH TWO OR MORE DIFFERENT THRESHOLD LEVELS

BACKGROUND

A magnetic sensor may sense a magnetic field produced or distorted by a rotating magnet wheel, such as a tooth wheel, an encoder wheel, or the like. The magnetic sensor may output, based on the sensed magnetic field, a signal for use in identifying a rotational direction of the magnet wheel, a rotational speed of the magnet wheel, a rotational angle of the magnet wheel, or the like.

SUMMARY

According to some possible implementations, a magnetic sensor may include one or more sensor components to: determine information associated with a magnet wheel, where the information associated with the magnet wheel may be associated with at least one of a rotational speed of the magnet wheel or a rotational direction of the magnet wheel; determine information associated with the magnetic sensor, where the information associated with the magnetic sensor may be associated with one or more properties of the magnetic sensor; and provide a signal including the information associated with the magnet wheel and the information associated with the magnetic sensor, where the signal may be provided using a pulse width modulation technique associated with at least three signal levels and at least two signal thresholds, where, based on the pulse width modulation technique, a period of time during which a bit of information associated with the magnetic sensor is provided at least partially overlaps a period of time during which a bit of information associated with the magnet wheel is provided, or where, based on the pulse width modulation technique, the bit of information associated with the magnetic sensor is provided without a time offset from the bit of information associated with the magnet wheel.

According to some possible implementations, a system may include a sensor to: determine information, associated with a wheel, that includes information associated with a rotational speed of the wheel or a rotational direction of the wheel; determine information, associated with the sensor, that includes information associated with one or more properties the sensor; and provide a signal, including the information associated with the wheel and the information associated with the sensor, based on a pulse width modulation technique associated with three or more signal levels and two or more signal thresholds, where, based on the pulse width modulation technique, an item of information associated with the sensor is provided in the signal during a period of time that at least partially overlaps a period of time during which an item of information associated with the wheel is provided, or where, based on the pulse width modulation technique, the item of information associated with the sensor is provided in the signal without a time delay after the item of information associated with the wheel.

According to some possible implementations, a method may include determining, by a sensor, information associated with a wheel, where the information associated with the wheel may be associated with at least one of a rotational speed of the wheel or a rotational direction of the wheel; determining, by the sensor, information associated with the sensor, where the information associated with the sensor may be associated with one or more properties the sensor; and providing, by the sensor, a signal including the information associated with the wheel and the information associated with the sensor, where the signal may be provided based on a modulation technique associated with at least three signal levels and at least two signal thresholds, where, based on the modulation technique and within the signal, at least one bit of information associated with the sensor is provided during a period of time that at least partially overlaps with a period of time during which at least one bit of information associated with the wheel is provided, or where, based on the modulation technique and within the signal, the at least one bit of information associated with the sensor is provided without a time offset from the at least one bit of information associated with the wheel, and where the signal may be provided to an electronic control unit (ECU) in order to permit the ECU to determine, based on the signal, the information associated with the wheel and the information associated with the sensor.

DETAILED DESCRIPTION

Figure 1:
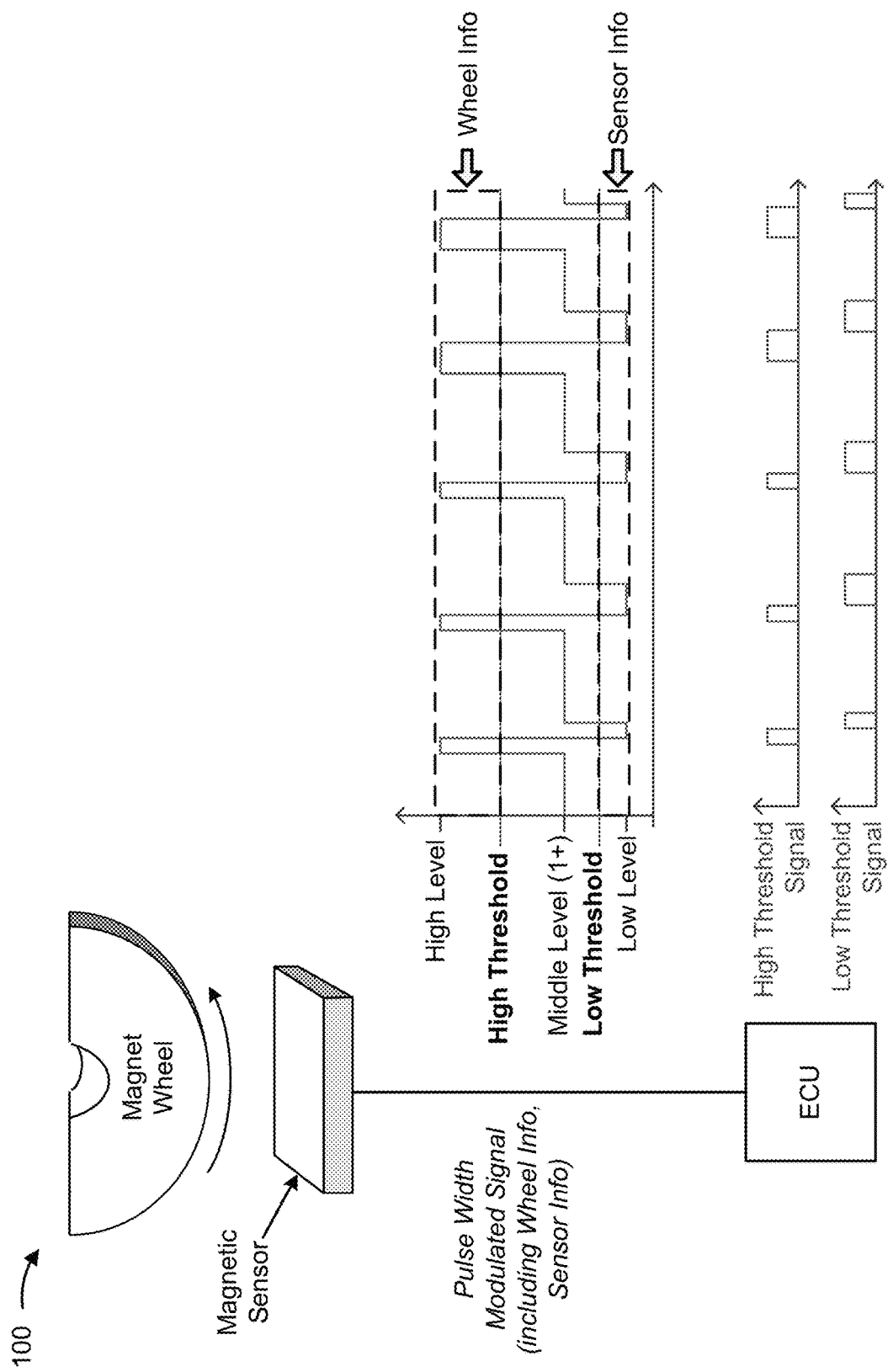
FIG. 1 is a diagram of an overview of an example implementation described herein.

The following detailed description of example implementations refers to the accompanying drawings. The same reference numbers in different drawings may identify the same or similar elements.

A magnetic sensor may be capable of providing (e.g., to an electronic control unit (ECU)) a signal corresponding to a property of a magnet wheel (e.g., an encoder wheel or a tooth wheel mechanically connected to a rotatable object), such as a rotational direction, a rotational speed, an angular position, or the like. In some cases, the magnetic sensor may provide the signal (e.g., a current, a voltage) using a pulse width modulation technique, such as that defined by a (PWM) protocol.

The PWM protocol generally includes a high signal level, a low signal level, and a signal threshold (e.g., a signal level between the high signal level and the low signal level). In accordance with the PWM protocol, the magnetic sensor outputs (e.g., to an ECU) a signal that corresponds to a profile of the magnet wheel. For example, the magnetic sensor may output a signal at the low signal level until a tooth of the magnet wheel is detected, at which point the signal is increased to the high signal level for a defined duration of time (herein referred to pulse width). The magnetic sensor then returns the signal to the low signal level. The pulse width may correspond to a rotational direction of the magnet wheel (e.g., a first pulse width representing forward rotation and a second pulse width representing a backward rotation). The pulses in the signal allow the ECU to determine a rotational direction of the magnet wheel (e.g., based on the pulse width), a rotational speed of the magnet wheel (e.g., based on a frequency of the pulses), and/or the like.

In some cases, the magnetic sensor may need to provide information in addition to the information associated with the magnet wheel (i.e., in addition to the pulses from which the rotational direction and the rotational speed can be determined). For example, the magnetic sensor may need to provide information corresponding to one or more properties of the magnetic sensor itself, such as information associated with ensuring functional safety of the magnetic sensor. In some implementations, such additional information may include, for example, information associated with a temperature of the magnetic sensor, information associated with a magnetic field strength at the magnetic sensor, information associated with an error experienced by the magnetic sensor, an alive signal associated with the magnetic sensor (e.g., a signal indicating that the magnetic sensor is operational when the magnet wheel is not rotating or is rotating at less than a threshold rotational speed), and/or the like. In some implementations, such additional information may include information received from another device (e.g., another sensor connected to the magnetic sensor).

However, the PWM protocol does not provide support for one or more signals carrying such additional information. Furthermore, a modification of the PWM protocol that would allow such signals to be provided by the magnetic sensor and decoded by the ECU may require modifying software configured on the ECU, which may be costly in terms of temporal and/or monetary resources, and/or may reduce (or make uncertain) reliability of the ECU software. Such software modification may be required even in a sensor system in which the ArbeitsKreis (AK) protocol is to be implemented in order to permit a sensor to provide such additional information to an ECU, since the AK protocol is not entirely compatible with the PWM protocol.

Another technique that may allow the magnetic sensor to provide such additional information to the ECU is to add another hardware channel (e.g., an additional pin and wire connection) via which a separate signal may be provided. However, adding another hardware channel may also be costly in terms of temporal and/or monetary resources (e.g., since physical modification of the sensor system is needed), and would result in increased area and/or size of the magnetic sensor and/or the ECU.

Implementations described herein provide a magnetic sensor that uses a pulse width modulation technique associated with at least three signal levels and at least two signal thresholds in order to allow information associated with a magnetic sensor (e.g., functional safety information) and information associated with a magnet wheel (e.g., information associated with a rotational direction, a rotational speed, and/or the like) to be provided in a single signal and decoded by an ECU. The pulse width modulation technique described herein can be made entirely compatible with the PWM protocol, thereby eliminating a need to modify software, associated with the PWM protocol, configured on the ECU 220, thereby maintaining reliability of the PWM protocol, while allowing additional information to be provided.

FIG. 1 is a diagram of an overview of an example implementation 100 described herein. As shown in FIG. 1, a magnetic sensor may be arranged to sense a magnetic field, produced or distorted by a magnet wheel (e.g., an encoder wheel, a tooth wheel, and/or the like). As further shown, the magnetic sensor may provide, to an ECU, a pulse width modulated signal (e.g., a current signal, a voltage signal) including information associated with the tooth wheel (e.g., information associated with a rotational direction, a rotational speed, an angular position, and/or the like) and information associated with the magnetic sensor (e.g., information associated with a temperature of the magnetic sensor, information associated with an amplitude value of a speed and direction signal, information associated with an error experienced by the magnetic sensor, an alive signal associated with the magnetic sensor, another type of functional safety information, and/or the like).

In order to provide such a signal, the magnetic sensor may implement a pulse width modulation technique associated with at least three signal levels and at least two signal thresholds. As shown in FIG. 1, the at least three signal levels may include a high level, a low level, and at least one middle level, where the middle level is between the high level and the low level. As further shown, the at least two signal thresholds may include a high threshold (e.g., between the middle level and the high level) and a low threshold (e.g., between the middle level and the low level).

As further shown in FIG. 1, the magnetic sensor may provide the signal, in accordance with the above described pulse width modulation technique, in order to provide the information associated with the magnet wheel and the information associated with the magnetic sensor. For example, as shown, the magnetic sensor may provide the signal such that the information associated with the magnet wheel is encoded in the signal between the high threshold and the high level, and such that the information associated with the magnetic sensor is encoded in the signal between the low level and the low threshold.

As further shown, the ECU may receive the signal provided by the magnetic sensor, and may decode the signal in order to determine the information associated with the magnet wheel and the information associated with the magnetic sensor. The pulse width modulation technique can be made entirely compatible with a PWM protocol already configured on the ECU (e.g., when the PWM protocol has been configured on the ECU in order to determine information associated with the magnet wheel based on a signal provided by the magnetic sensor), thereby eliminating a need for modification of ECU software associated with the PWM protocol.

As indicated above, FIG. 1 is provided merely as an example. Other examples are possible and may differ from what was described with regard to FIG. 1. Various detailed examples of pulse width modulation techniques, associated with at least three signal levels and at least two signal thresholds, are described below.

Figure 2A:
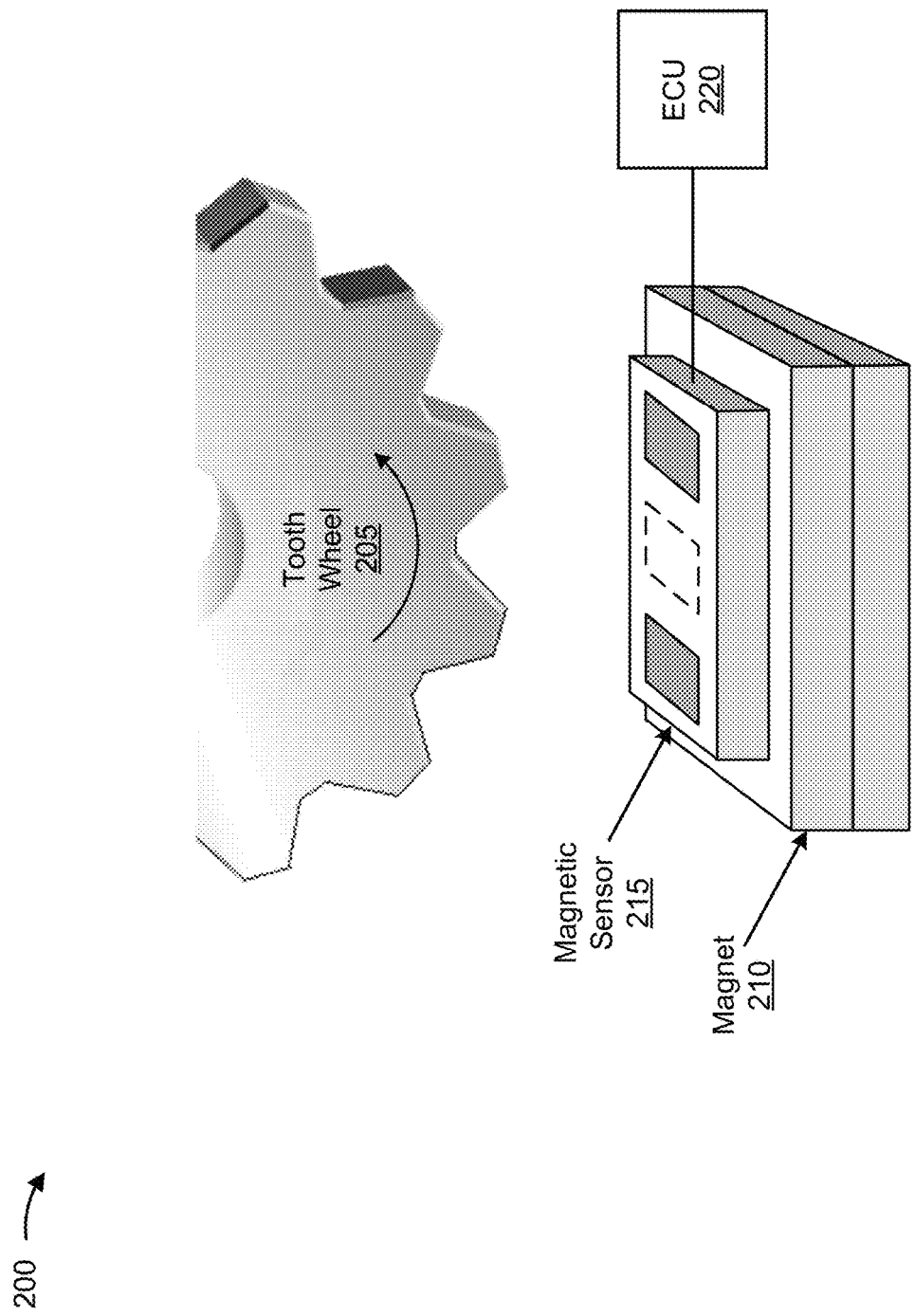
FIGS. 2A and 2B are diagrams of example environments in which systems and/or methods, described herein, may be implemented.
Figure 2B:
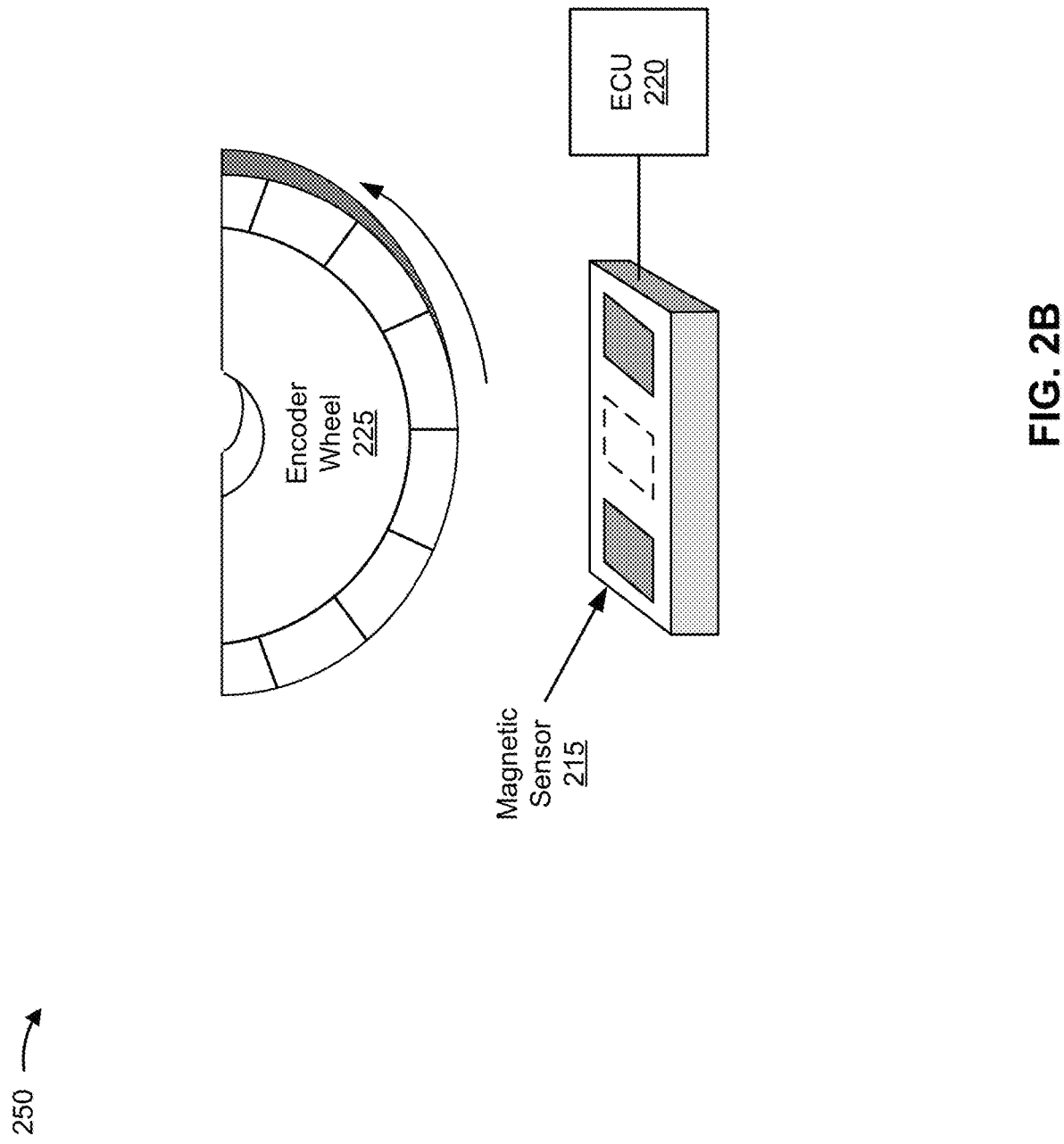

FIGS. 2A and 2B are diagrams of example environments 200 and 250 in which apparatuses described herein may be implemented. As shown in FIG. 2A, environment 200 may include a tooth wheel 205, a magnet 210, a magnetic sensor 215, and an ECU 220.

Tooth wheel 205 includes a wheel comprising a set of teeth. In some implementations, tooth wheel 205 may, during a rotation, distort a magnetic field of a magnet 210 such that magnetic sensor 215 may sense the distorted magnetic field associated with magnet 210. In some implementations, tooth wheel 205 may be comprised of a ferromagnetic material. In some implementations, tooth wheel 205 may be attached to or coupled with an object for which a rotational speed, a rotational direction, and/or an angular position is to be measured, such as a cylindrical structure (e.g., a crankshaft, a camshaft, a rotating cylinder, etc.), a wheel structure (e.g., associated with a tire), an axle (e.g., a vehicle axle), or the like.

In some implementations, such as in a crankshaft context, tooth wheel 205 may include a symmetrical tooth wheel, where teeth of tooth wheel 205 have a same width and tooth gaps of tooth wheel 205 have a same width. In some implementations, such as in a camshaft context, tooth wheel 205 may include an asymmetrical tooth wheel, where teeth of tooth wheel 205 have varying widths and/or tooth gaps of tooth wheel 205 have varying widths.

Magnet 210 includes a magnet that produces a magnetic field that may be sensed by magnetic sensor 215. In some implementations, magnet 210 may be positioned such that the magnetic field, produced by magnet 210, is distorted by tooth wheel 205. Additionally, or alternatively, magnet 210 may include a back-bias magnet and/or may be positioned near, included in, and/or attached to magnetic sensor 215.

Magnetic sensor 215 includes a housing associated with one or more components (also referred to herein as "sensor components") of a sensor, such as a magnetoresistive (MR) sensor, a Hall-effect sensor, a variable reluctance sensor (VRS), a fluxgate sensor, or the like. In some implementations, magnetic sensor 215 may be connected to ECU 220 such that magnetic sensor 215 may transmit information associated with a magnet wheel (e.g., tooth wheel 205, encoder wheel 225) and/or information associated with magnetic sensor 215 (e.g., information associated with a temperature of magnetic sensor 215, information associated with an amplitude value of a speed and direction signal, information associated with an error experienced by magnetic sensor 215, an alive signal associated with magnetic sensor 215, another type of functional safety information, and/or the like) to ECU 220 via one or more transmission interfaces (e.g., a voltage interface, a current interface, etc.) and/or via one or more output terminals. In some implementations, magnetic sensor 215 may include a three-wire sensor (e.g., including one output terminal), a four-wire sensor (e.g., including two output terminals), or the like. Additional details regarding magnetic sensor 215 are described below with regard to FIG. 3.

ECU 220 includes one or more circuits associated with determining a rotational speed and/or direction of a magnet wheel (i.e., a rotatable object that is connected to tooth wheel 205 or encoder wheel 225), determining information associated with magnetic sensor 215 (e.g., functional safety information), and/or providing information associated with the rotational speed and/or direction of the magnet wheel, and the information associated with magnetic sensor 215, in association with controlling one or more electrical systems and/or electrical subsystems. In some implementations, ECU 220 may be connected to magnetic sensor 215 such that ECU 220 may receive information associated with the magnet wheel and/or the information associated with magnetic sensor 215 via one or more transmission interfaces and/or via one or more output terminals.

In some implementations, ECU 220 may be capable of calibrating, controlling, adjusting, or the like, the one or more electrical systems and/or electrical subsystems based on the information transmitted by magnetic sensor 215. In some implementations, ECU 220 may include an electronic/engine control module (ECM), a powergain control module (PCM), a transmission control module (TCM), a brake control module (BCM or EBCM), a central control module (CCM), a central timing module (CTM), a general electronic module (GEM), a body control module (BCM), a suspension control module (SCM), or the like.

As shown in FIG. 2B, example environment 250 may alternatively include magnetic sensor 215, ECU 220, and encoder wheel 225 (e.g., rather than tooth wheel 205 and magnet 210). Encoder wheel 225 includes a magnetic pole wheel with at least two alternating poles, such as a north pole and a south pole. In some implementations, encoder wheel 225 may produce a magnetic field. In some implementations, encoder wheel 225 may be attached to or coupled with an object for which a rotational speed, a rotational direction, and/or a position is to be measured, such as a cylindrical structure (e.g., a crankshaft, a camshaft, a rotating cylinder, etc.), a wheel structure (e.g., associated with a tire), an axle (e.g., a vehicle axle), or the like.

The number and arrangement of apparatuses shown in FIGS. 2A and 2B are provided as an example. In practice, there may be additional apparatuses, fewer apparatuses, different apparatuses, or differently arranged apparatuses than those shown in FIGS. 2A and 2B. Furthermore, two or more apparatuses shown in FIGS. 2A and/or 2B may be implemented within a single apparatus, or a single apparatus shown in FIGS. 2A and/or 2B may be implemented as multiple, distributed apparatuses. Additionally, or alternatively, a set of apparatuses (e.g., one or more apparatuses) of FIGS. 2A and/or 2B may perform one or more functions described as being performed by another set of apparatuses of FIGS. 2A and/or 2B.

Figure 3:
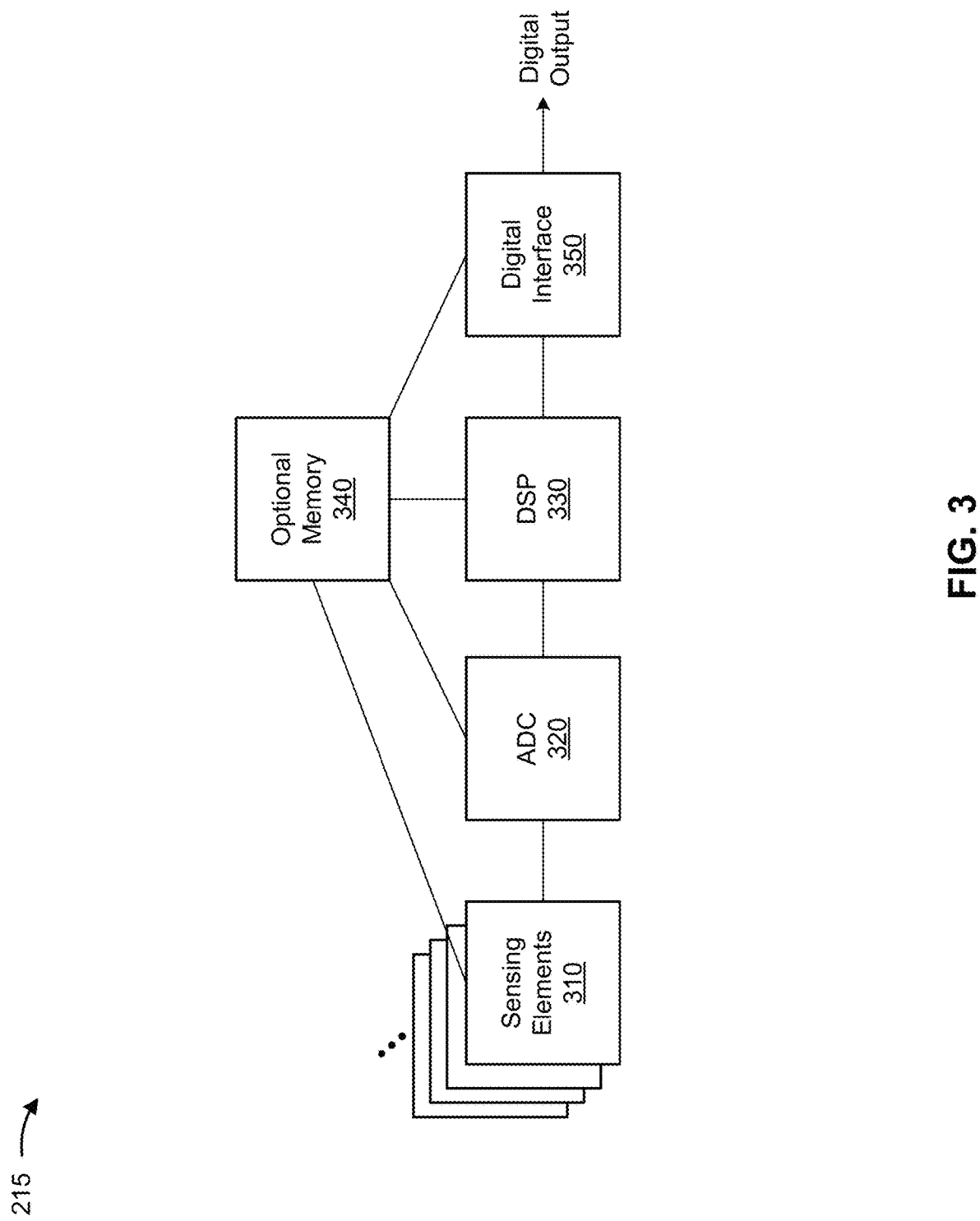
FIG. 3 is a diagram of example elements of a magnetic sensor included in the example environment of FIG. 2A or 2B.

FIG. 3 is a diagram of example elements of magnetic sensor 215 included in example environment 200 of FIG. 2. As shown, magnetic sensor 215 may include at least one sensing element 310, an analog-to-digital convertor (ADC) 320, a digital signal processor (DSP) 330, an optional memory element 340, and a digital interface 350.

Sensing element 310 includes an element for sensing a magnetic field at magnetic sensor 215. For example, sensing element 310 may include a magnetoresistive (MR)-based sensing element, elements of which are comprised of a magnetoresistive material (e.g., nickel-iron (NiFe)), where the electrical resistance of the magnetoresistive material may depend on a strength and/or a direction of the magnetic field present at the magnetoresistive material. Here, sensing element 310 may operate based on an anisotropic magnetoresistance (AMR) effect, a giant magnetoresistance (GMR) effect, a tunnel magnetoresistance (TMR) effect, or the like. As another example, sensing element 310 may include a Hall-based sensing element that operates based on a Hall-effect. As an additional example, sensing element 310 may include a variable reluctance (VR) based sensing element that operates based on induction. In some implementations, sensing element 310 may provide an analog signal, corresponding to the magnetic field, to ADC 320.

ADC 320 includes an analog-to-digital converter that converts an analog signal from the sensing element 310 to a digital signal. For example, ADC 320 may convert analog signals, received from the set of sensing elements 310, into digital signals to be processed by DSP 330. ADC 320 may provide the digital signals to DSP 330. In some implementations, magnetic sensor 215 may include one or more ADCs 320.

DSP 330 includes a digital signal processing device or a collection of digital signal processing devices. In some implementations, DSP 330 may receive digital signals from ADC 320 and may process the digital signals to form signals (e.g., destined for ECU 220 as shown in FIG. 2), such as signals associated with a rotational speed of tooth wheel 205/encoder wheel 225, a rotational direction of tooth wheel 205/encoder wheel 225, and/or information associated with magnetic sensor 215, as described herein.

Optional memory element 340 includes a read only memory (ROM) (e.g., an EEPROM), a random access memory (RAM), and/or another type of dynamic or static storage device (e.g., a flash memory, a magnetic memory, an optical memory, etc.) that stores information and/or instructions for use by magnetic sensor 215. In some implementations, optional memory element 340 may store information associated with processing performed by DSP 330. Additionally, or alternatively, optional memory element 340 may store configurational values or parameters for the set of sensing elements 310 and/or information for one or more other elements of magnetic sensor 215, such as ADC 320 or digital interface 350.

Digital interface 350 includes an interface via which magnetic sensor 215 may receive and/or provide information from and/or to another device, such as ECU 220 (see FIGS. 2A and 2B). For example, digital interface 350 may provide a signal (i.e., an output signal), determined by DSP 330, to ECU 220 and may further receive information from ECU 220. In some implementations, digital interface 350 permits magnetic sensor 215 to provide one or more signals to ECU 220 using a pulse width modulation technique associated with at least three current levels and at least two current thresholds s, as described elsewhere herein.

The number and arrangement of elements shown in FIG. 3 are provided as an example. In practice, magnetic sensor 215 may include additional elements, fewer elements, different elements, or differently arranged elements than those shown in FIG. 3. Additionally, or alternatively, a set of elements (e.g., one or more elements) of magnetic sensor 215 may perform one or more functions described as being performed by another set of elements of magnetic sensor 215.

Figure 4A:
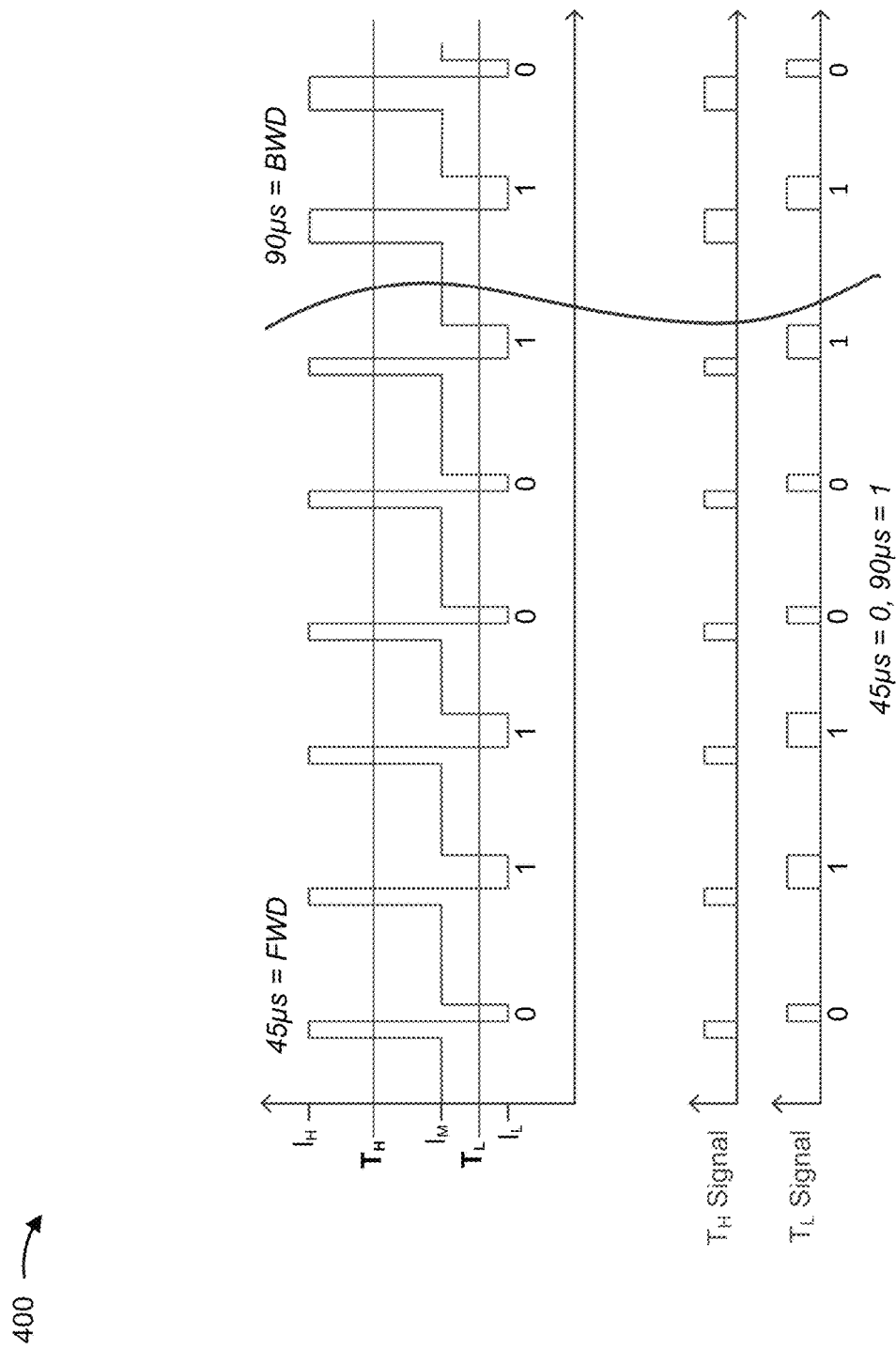
FIGS. 4A and 4B are graphical representations of example implementations of pulse width modulation techniques, associated with at least three signal levels and at least two signal thresholds, where information associated with a magnetic sensor is synchronous with information associated with the magnet wheel.
Figure 4B:
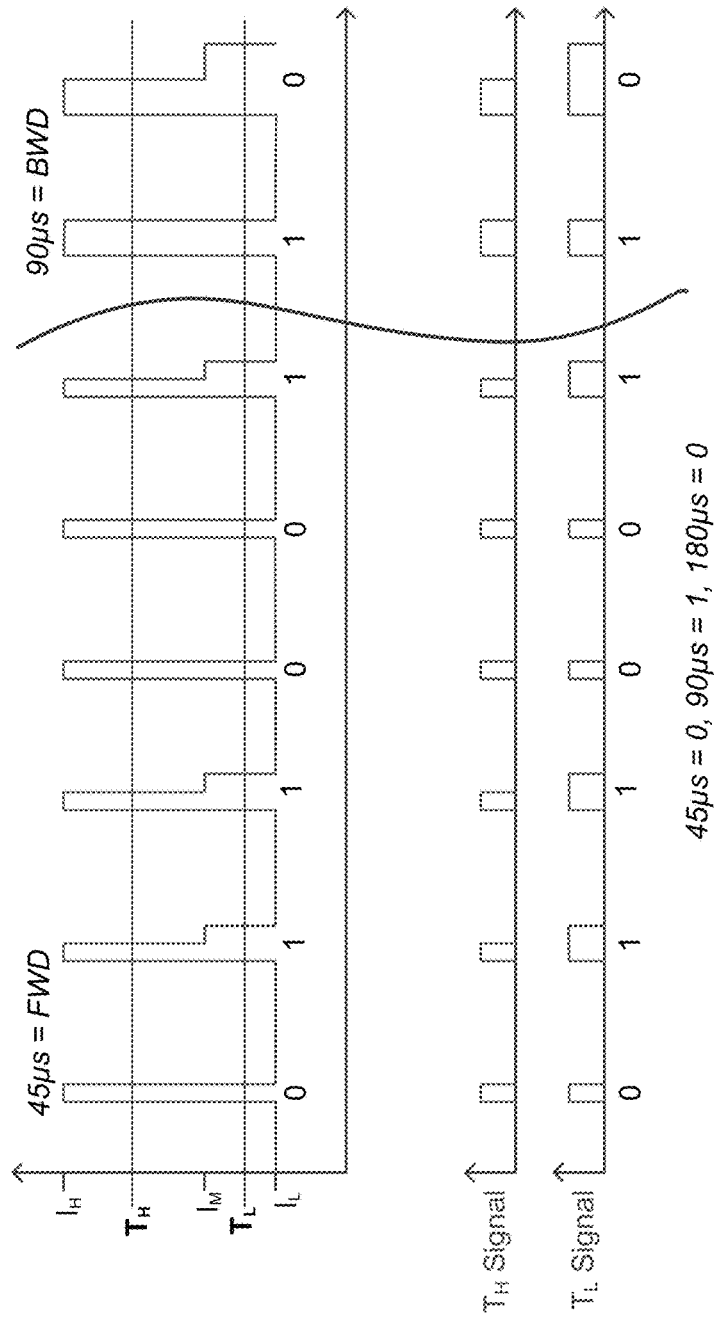

FIGS. 4A and 4B are graphical representations of example implementations pulse width modulation techniques, associated with at least three signal levels and at least two signal thresholds, where information associated with a magnetic sensor is synchronous with information associated with the magnet wheel.

As shown in FIG. 4A, magnetic sensor 215 may implement a pulse width modulation technique 400 associated with at least three signal levels and at least two signal thresholds. As shown in the upper portion of FIG. 4A, the at least three signal levels may include a high current level ($I_H$) (e.g., 14 milliamps (mA), 28 mA, and/or the like), a low current level ($I_L$) (e.g., 0 mA, 3.5 mA, and/or the like), and at least one middle current level ($I_M$) (e.g., 7 mA, 14 mA, and/or the like), where the middle current level is between the high current level and the low current level. As further shown, the at least two signal thresholds may include a high current threshold (e.g., $T_H$, between $I_M$ and $I_H$) and a low current threshold (e.g., $T_L$, between $I_M$ and $I_L$).

In pulse width modulation technique 400, the information associated with the magnet wheel may be encoded in the signal between the high current threshold and the high current level based on the PWM protocol. For example, as shown, the information associated with the magnet wheel may be encoded in pulse widths of different lengths (e.g., a 45 microsecond (µs) indicating a forward rotation and a 90 µs pulse indicating a backward rotation). As further shown, information associated with magnetic sensor 215 may be encoded in the signal between the low current threshold and the low signal level. For example, as shown, the information associated with magnetic sensor 215 (e.g., a sequence of bits including 01100110) may be encoded in pulse widths of different lengths (e.g., shown as a 45 µs pulse representing a 0 bit and a 90 µs pulse representing a 1 bit—though the reverse could alternatively be used). In some implementations, the low current threshold may be associated with one or more other pulse widths that may be used to deliver a greater amount of information associated with magnetic sensor 215 (e.g., if four pulse widths are used, then two bits of information associated with magnetic sensor 215 may be provided in a single pulse).

In pulse width modulation technique 400, the information associated with magnetic sensor 215 is synchronized with (e.g., dependent on) the information associated with the magnet wheel. For example, as shown, a pulse representing a bit of information associated with magnetic sensor 215 is provided based on (e.g., immediately following, without waiting for a particular period of time, without a time offset or shift, and/or the like) a pulse associated with the magnet wheel. In some implementations, the information associated with the magnetic sensor 215 may be provided based on each pulse (e.g., after every pulse) associated with the magnet wheel and/or based on a subset of pulses associated with the magnet wheel (e.g., every third pulse, every tenth pulse, only when magnetic sensor 215 has additional information to be provided, and/or the like).

In some implementations, ECU 220 may determine the information associated with the magnet wheel and the information associated with magnetic sensor 215 based on the at least two signal thresholds. For example, as shown in the lower portion of FIG. 4A, ECU 220 may determine the information associated with the magnet wheel based on identifying a portion of the signal from the high current threshold to the high current level (labeled as "$T_H$ signal" in the lower portion of FIG. 4A). Similarly, ECU 220 may determine the information associated with magnetic sensor 215 based on identifying a portion of the signal from the low current threshold to the low signal level (labeled as "$T_L$ signal" in the lower portion of FIG. 4A).

FIG. 4B is a graphical representation of an alternative pulse width modulation technique 410 associated with at least three signal levels and at least two signal thresholds. As shown in the upper portion of FIG. 4B, pulse width modulation technique 410 may be associated with the at least three signal levels (e.g., $I_H$, $I_L$, $I_M$) and the at least two signal thresholds (e.g., $T_H$, and $T_L$). The information associated with the magnet wheel may be encoded in a manner similar to that described in association with pulse width modulation technique 400 of FIG. 4A.

As shown in the upper portion of FIG. 4B, information associated with magnetic sensor 215 may be encoded in the signal between the low current threshold and the middle signal level. For example, as shown, the information associated with magnetic sensor 215 (e.g., a sequence of bits including 01100110) may be encoded in pulse widths of different lengths (e.g., shown as a 45 μs and a 180 μs pulse representing a 0 bit, and a 90 μs pulse representing a 1 bit—though the reverse could alternatively be used).

In pulse width modulation technique 410, the information associated with magnetic sensor 215 is synchronized with the information associated with the magnet wheel. For example, as shown, a pulse representing a bit of information associated with magnetic sensor 215 is provided at least partially concurrently with (e.g., without waiting for a time offset or shift) a pulse associated with the magnet wheel. In some implementations, the information associated with the magnetic sensor 215 may be provided at least partially concurrently with a pulse associated with the magnet wheel. For example, a pulse representing a bit of information associated with magnetic sensor 215 may have a pulse width that is greater than or equal to a pulse width of a pulse representing a bit of information associated with the magnet wheel.

In some implementations, ECU 220 may determine the information associated with the magnet wheel and the information associated with magnetic sensor 215 based on the at least two signal thresholds. For example, as shown in the lower portion of FIG. 4B, ECU 220 may determine the information associated with the magnet wheel based on identifying a portion of the signal from the high current threshold to the high signal level (labeled as "$T_H$ signal" in the lower portion of FIG. 4B). Similarly, ECU 220 may determine the information associated with magnetic sensor 215 based on identifying a portion of the signal from the low current threshold to the middle signal level (labeled as "$T_L$ signal" in the lower portion of FIG. 4B). In some implementations, when configured with pulse width modulation technique 410, ECU 220 may be configured to interpret a repeating sequence of bits (e.g., a threshold number of consecutive 0 bits during a forward rotation, a threshold number of consecutive 1 bits during a backward rotation, or vice versa) as an indication that magnetic sensor 215 is not providing any information associated with magnetic sensor 215.

As indicated above, FIGS. 4A and 4B are provided merely as examples. Other examples are possible and may differ from what was described with regard to FIGS. 4A and 4B. For example, a number and/or a spacing of signal levels, a number and/or a spacing of signal thresholds, pulse widths, signal thresholds and signal levels based on which information associated with the magnet wheel is encoded in the signal and determined from the signal, signal thresholds and signal levels based on which information associated with magnetic sensor 215 is encoded in the signal and determined from the signal, and/or the like, are provided merely as examples, and other examples are possible than those described in connection with FIGS. 4A and 4B.

FIGS. 5A-5E are graphical representations of example implementations of pulse width modulation techniques, associated with at least three signal levels and at least two signal thresholds, where information associated with a magnetic sensor is asynchronous with information associated with the magnet wheel.

Figure 5A:
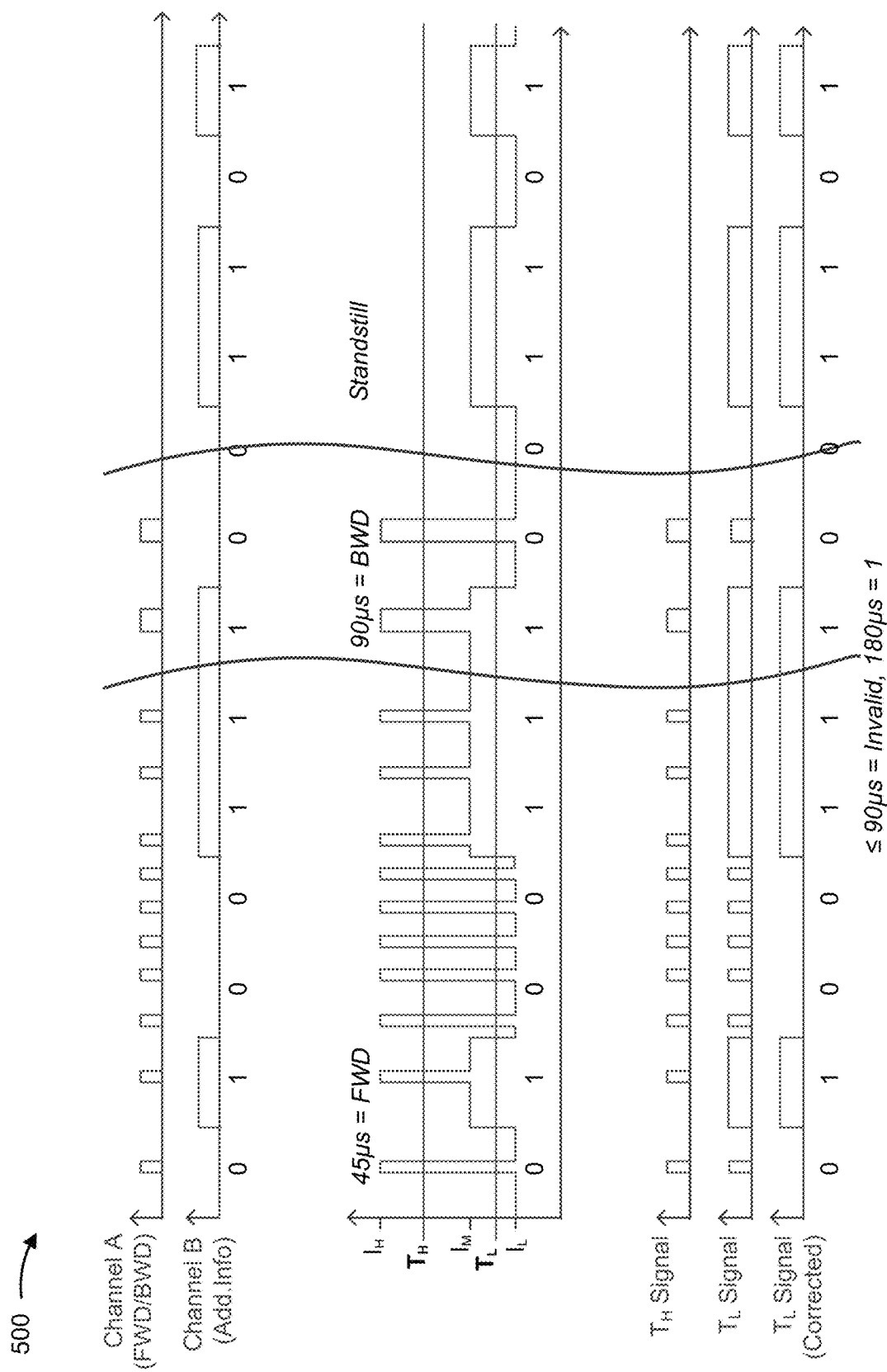
FIGS. 5A-5E are graphical representations of example implementations of pulse width modulation techniques, associated with at least three signal levels and at least two signal thresholds, where information associated with a magnetic sensor is asynchronous with information associated with the magnet wheel.

FIG. 5A is graphical representation of an example implementation of pulse width modulation technique 500, associated with at least three signal levels and at least two signal thresholds, that allows magnetic sensor 215 to provide information associated with magnetic sensor 215 that is asynchronous with (i.e., independent of) information associated with the magnet wheel is provided.

For example, as shown in the upper portion of FIG. 5A, magnetic sensor 215 may need to provide a signal representing information associated with a magnet wheel (labeled as "channel A (FWD/BWD)" in FIG. 5A) and a signal representing information associated with magnetic sensor 215 (labeled as "channel B (Add. Info)" in FIG. 5A). As shown, magnetic sensor 215 may be configured to provide the information associated with magnetic sensor 215 on a periodic basis (e.g., where each 180 μs represents a bit) regardless of whether, and independent from, providing information associated with the magnet wheel.

As shown in the middle portion of FIG. 5A, the at least three signal levels may include a high current level ($I_H$), a low current level ($I_L$), and at least one middle current level ($I_M$), where the middle current level is between the high current level and the low current level. As further shown, the at least two signal thresholds may include a high current threshold (e.g., $T_H$, between $I_M$ and $I_H$) and a low current threshold (e.g., $T_L$, between $I_M$ and $I_L$).

In pulse width modulation technique 500, the information associated with the magnet wheel may be encoded in a signal between the high current threshold and the high current level based on the PWM protocol. For example, as shown, the information associated with the magnet wheel may be encoded in pulse widths of different lengths (e.g., a 45 μs indicating a forward rotation and a 90 μs pulse indicating a backward rotation, or vice versa). As further shown, the information associated with magnetic sensor 215 may be encoded in the signal between the low current threshold and the middle signal level. For example, as shown, the information associated with magnetic sensor 215 (e.g., a sequence of bits including 0100111001101) may be encoded based on pulses at the middle current level with pulse widths of 180 μs.

In pulse width modulation technique 500, the information associated with magnetic sensor 215 is asynchronous with the information associated with the magnet wheel. For example, as shown in FIG. 5A, the information associated with magnetic sensor 215 is not dependent on pulses representing the information associated with the magnetic wheel (i.e., does not depend on rotation of the magnet wheel), may be provided at a different rate than the information associated with the magnet wheel, and may be provided even when the magnet wheel is not rotating (e.g., when the magnet wheel is at a standstill).

In some implementations, ECU 220 may determine the information associated with the magnet wheel and the information associated with magnetic sensor 215 based on the at least two signal thresholds. For example, as shown in the lower portion of FIG. 5A, ECU 220 may determine the information associated with the magnet wheel based on identifying a portion of the signal from the high current threshold to the high current level (labeled as "$T_H$ signal" in the lower portion of FIG. 5A).

Continuing with this example, ECU 220 may determine the information associated with magnetic sensor 215 based on a portion of the signal from the low current threshold to the middle signal level (labeled as "$T_L$ signal" in the lower portion of FIG. 5A). However, as shown, the portion of the signal from the low current threshold to the middle signal level may include pulses corresponding to the information associated with the magnet wheel. Here, ECU 220 may be configured to disregard pulses, from the low current threshold to the middle signal level, with pulse widths that are less than or equal to a threshold pulse width (e.g., less than 180 μs, less than or equal to approximately 90 μs, and/or the like), in order to remove pulses representing the information associated with the magnet wheel from the portion of the signal representing the information associated with magnetic sensor 215. As shown, ECU 220 may determine the information associated with magnetic sensor 215 (labeled "$T_L$ signal (corrected)" in the lower portion of FIG. 5A) based on removing (i.e., correcting for) the pulses representing the information associated with the magnet wheel.

Figure 5B:
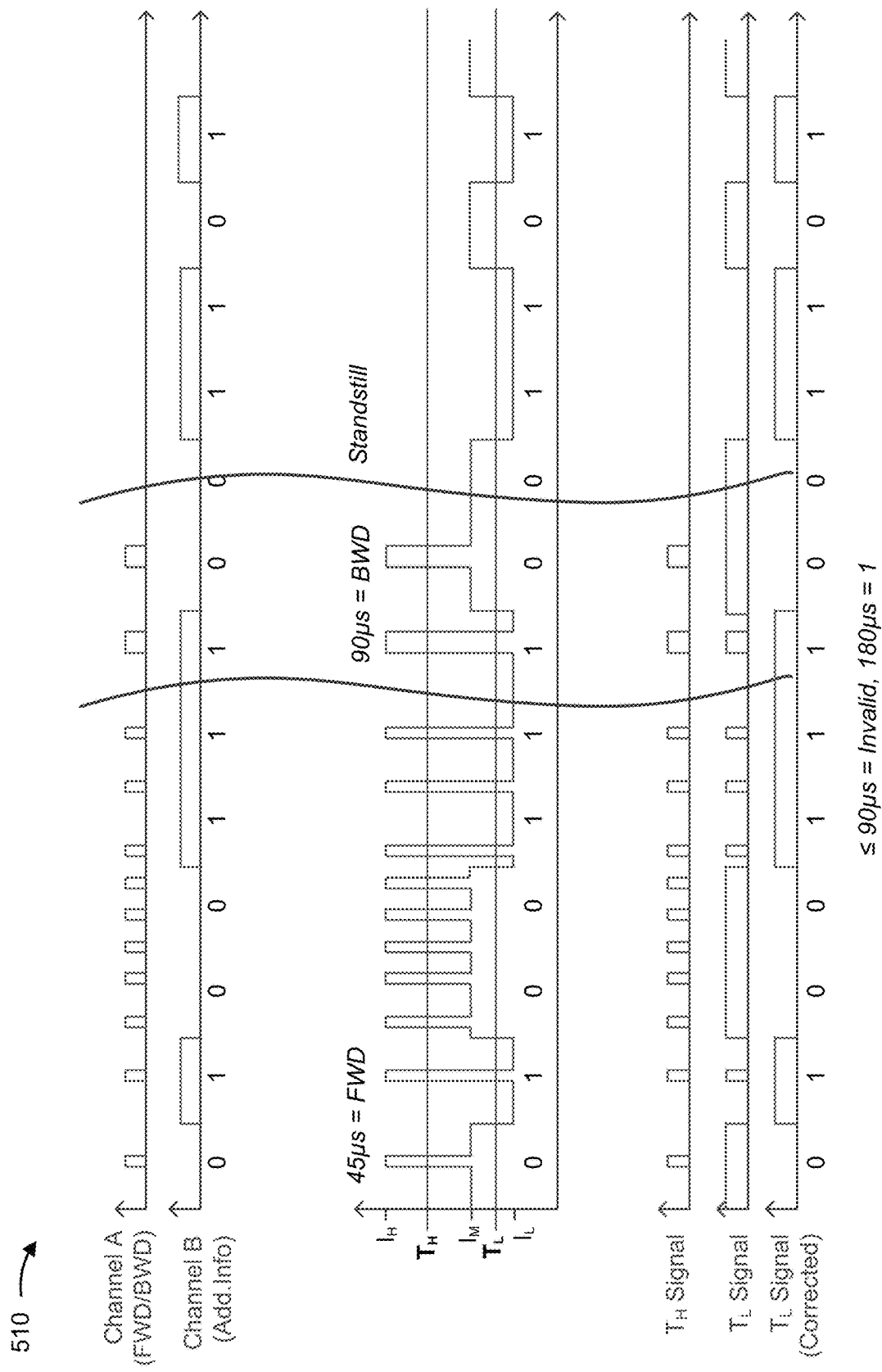

FIG. 5B is a graphical representation of an alternative pulse width modulation technique 510 associated with at least three signal levels and at least two signal thresholds. As shown in the upper portion of FIG. 5B, magnetic sensor 215 may need to provide a signal representing information associated with a magnet wheel (labeled as "channel A (FWD/BWD)" in FIG. 5B) and a signal representing information associated with magnetic sensor 215 (labeled as "channel B (Add. Info)" in FIG. 5B). The information associated with the magnet wheel and the information associated with magnetic sensor 215 may be encoded in a manner similar to that described in association with pulse width modulation technique 500 of FIG. 5A.

As shown by the middle portion of FIG. 5B, pulse width modulation technique 510 may be associated with providing information using the at least three signal levels (e.g., $I_H$, $I_L$, $I_M$) and the at least two signal thresholds (e.g., $T_H$, and $T_L$).

In some implementations, as further shown in the middle portion of FIG. 5B, an inverse of the information associated with magnetic sensor 215 may be encoded in the signal between the low current threshold and the middle signal level. For example, as shown, the inverse of the information associated with magnetic sensor 215 (e.g., a sequence of bits including 0100111001101) may be encoded based on a pulses with a pulse width of 180 μs. In some implementations, inverting the information associated with magnetic sensor 215 may reduce a likelihood of error and/or simplify decoding of the information associated with magnetic sensor 215. In pulse width modulation technique 510, the information associated with magnetic sensor 215 is asynchronous with the information associated with the magnet wheel (as described above with regard to FIG. 5A).

In some implementations, ECU 220 may determine the information associated with the magnet wheel and the information associated with magnetic sensor 215 based on the at least two signal thresholds. For example, as shown in the lower portion of FIG. 5B, ECU 220 may determine the information associated with the magnet wheel based on identifying a portion of the signal from the high current threshold to the high current level (labeled as "$T_H$ signal" in the lower portion of FIG. 5B).

Continuing with this example, ECU 220 may determine the information associated with magnetic sensor 215 based on a portion of the signal from the low current threshold to the middle signal level (labeled as "$T_L$ signal" in the lower portion of FIG. 5B). However, as shown, the portion of the signal from the low current threshold to the middle signal level may include pulses corresponding to the information associated with the magnet wheel. Here, ECU 220 may be configured to disregard pulses, from the low current threshold to the middle signal level, with pulse widths that are less than or equal to a threshold pulse width (e.g., less than 180 μs, less than or equal to approximately 90 μs, and/or the like), in order to remove pulses representing the information associated with the magnet wheel from the portion of the signal representing the information associated with magnetic sensor 215. As further shown, ECU 220 may invert the remaining portion of the $T_L$ signal and determine the information associated with magnetic sensor 215 (labeled "$T_L$ signal (corrected)" in the lower portion of FIG. 5B).

Figure 5C:
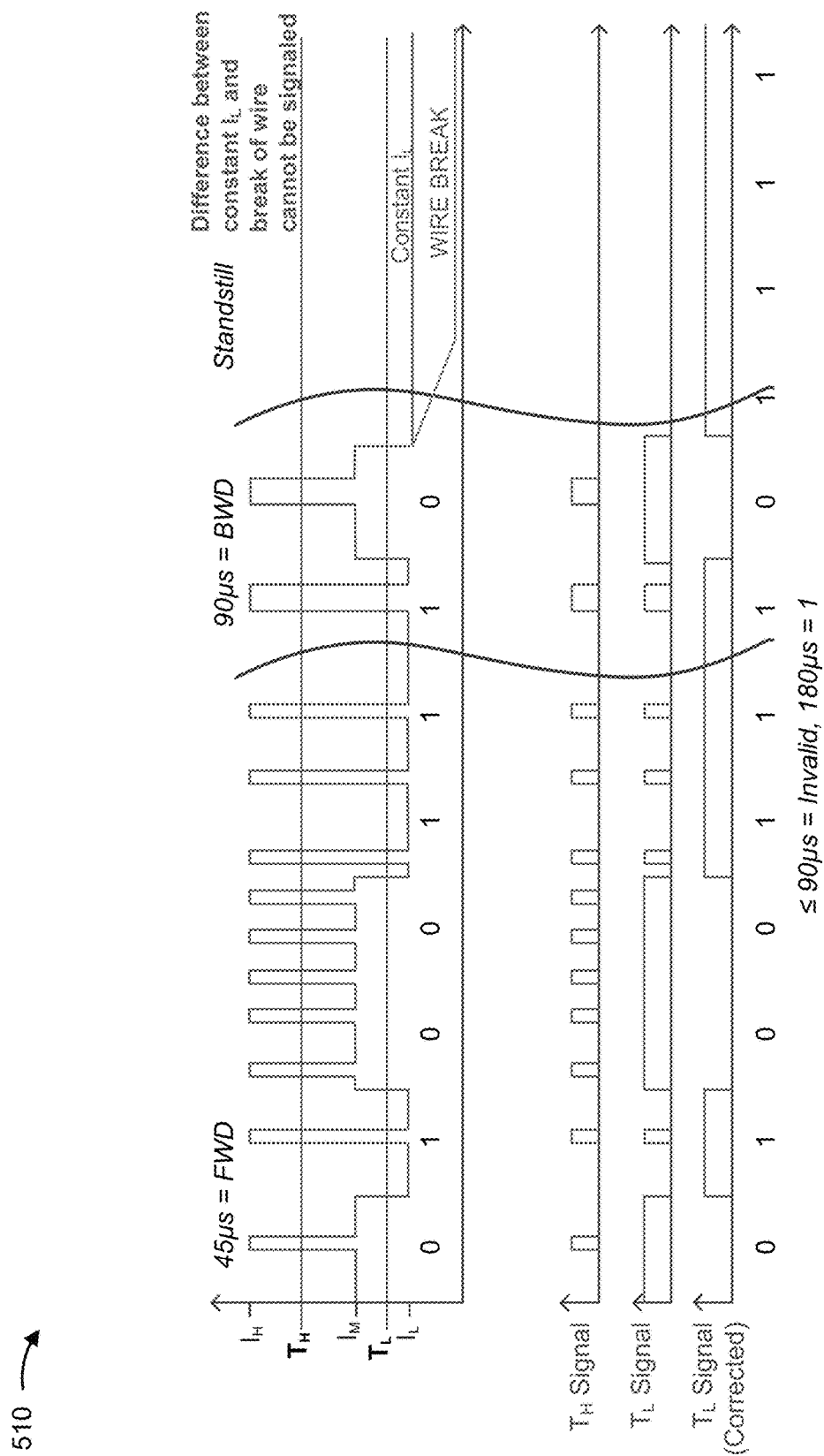

In some implementations, when implementing pulse width modulation technique 500 or 510, magnetic sensor 215 may be unable to signal, and ECU 220 may be unable to distinguish, between a constant low current of 0 mA and a wire break (e.g., when a wire between magnetic sensor 215 and ECU 220 is disconnected, severed, broken, or the like), if the magnet wheel is at a standstill (i.e., not rotating) and magnetic sensor 215 is providing a sequence of repeating bits. For example, as shown in FIG. 5C, in a case where magnetic sensor 215 implements pulse width modulation technique 510 and the magnet wheel is at a standstill (e.g., such that no information associated with the magnet wheel is being provided) a signal with a constant current at the low current level (e.g., 0 mA) is provided by magnetic sensor 215 in two cases: when transmitting a repeating sequence of bits (e.g., 1111111) or as a result of a wire break between magnetic sensor 215 and ECU 220. Here, as illustrated in the lower portion of FIG. 5C, ECU 220 may be unable to distinguish between a wire break and a wheel standstill during a sequence of repeated bits (e.g., a sequence of consecutive 1s) and, thus, may incorrectly determine that magnetic sensor 215 is transmitting the sequence of repeated bits after a wire break.

In some implementations, magnetic sensor 215 may ensure that ECU 220 is able to distinguish between a wire break and a wheel standstill during a sequence of repeated bits, representing information associated with magnetic sensor 215, by providing the information associated with magnetic sensor 215 using Manchester code or another type of code where information (e.g., a bit) is signaled by a transition of a signal (e.g., from a first signal level to a second signal level, rather than a pulse width at a particular level).

Figure 5D:
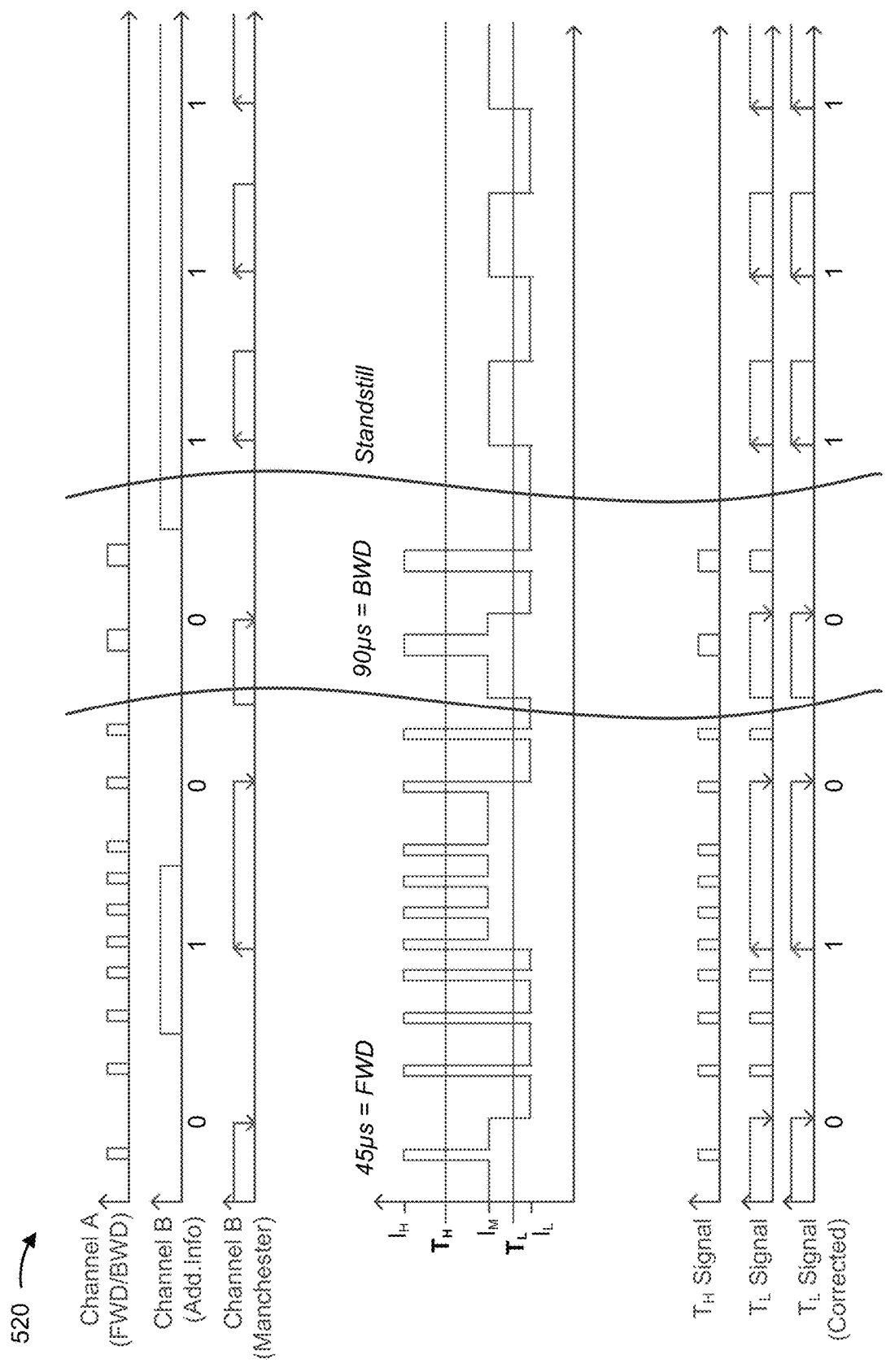

FIG. 5D is a graphical representation of an alternative pulse width modulation technique 520, associated with at least three signal levels and at least two signal thresholds, that uses Manchester code for signaling information associated with magnetic sensor 215.

As shown in the upper portion of FIG. 5D, magnetic sensor 215 may need to provide information associated with a magnet wheel (labeled as "channel A (FWD/BWD)" in FIG. 5D) and information associated with magnetic sensor 215 (labeled as "channel B (Add. Info)" in FIG. 5D). The information associated with the magnet wheel may be encoded in a manner similar to that described in association with pulse width modulation technique 500 of FIG. 5A.

As further shown in the upper portion of FIG. 5D, the information associated with magnetic sensor 215 may be encoded using Manchester code, where a downward transition of the current (i.e., from a lower level to a higher level) represents a 0 bit, and an upward transition of the current (i.e., from the higher level to the lower level) represents a 1 bit (though the reverse could alternatively be used).

As shown in the middle portion of FIG. 5D, pulse width modulation technique 520 may be associated with providing information using the at least three signal levels (e.g., $I_H$, $I_L$, $I_M$) and the at least two signal thresholds (e.g., $T_H$, and $T_L$).

As further shown, the information associated with magnetic sensor 215 may be encoded in the signal using Manchester code. For example, the information associated with magnetic sensor 215 (e.g., a sequence of bits including 0100111) may be encoded based on upward and downward transitions of the signal current. As a particular example, magnetic sensor 215 may transition the signal from the middle current level to the low current level (i.e., a downward crossing of the low current threshold) in order to signal a 0 bit. Similarly, magnetic sensor 215 may transition the signal from the low current level to the middle current level (i.e., an upward crossing of the low current threshold) in order to signal a 1 bit. In pulse width modulation technique 520, the information associated with magnetic sensor 215 is asynchronous with the information associated with the magnet wheel.

In some implementations, ECU 220 may determine the information associated with the magnet wheel and the information associated with magnetic sensor 215 based on the at least two signal thresholds. For example, as shown in the lower portion of FIG. 5D, ECU 220 may determine the information associated with the magnet wheel based on identifying a portion of the signal from the high current threshold to the high current level (labeled as "$T_H$ signal" in the lower portion of FIG. 5D).

Continuing with this example, ECU 220 may determine the information associated with magnetic sensor 215 based on a portion of the signal from the low current threshold to the middle signal level (labeled as "$T_L$ signal" in the lower portion of FIG. 5D). However, as shown, the portion of the signal from the low current threshold to the middle signal level may include pulses corresponding to the information associated with the magnet wheel. Here, ECU 220 may be configured to disregard pulses, from the low current threshold to the middle signal level, with pulse widths that are less than or equal to a threshold pulse width (e.g., less than 180 μs, less than or equal to approximately 90 μs, and/or the like), in order to remove pulses representing the information associated with the magnet wheel from the portion of the signal representing the information associated with magnetic sensor 215. As further shown, ECU 220 may determine the information associated with magnetic sensor 215 (labeled "$T_L$ signal (corrected)" in the lower portion of FIG. 5D) based on removing the pulses representing the information associated with the magnet wheel and identifying directions of transitions in the remaining portion of the signal. In some implementations, ECU 220 may be configured to disregard a transition (e.g., such that ECU 220 will not interpret the transition as a bit), when an amount of time between the transition and a most recent transition is less than or equal to a threshold amount of time (e.g., less than or equal to approximately 180 μs) and/or based on a threshold rate configured on ECU 220 (e.g., where ECU 220 ignores transitions that would increase a data rate beyond the threshold rate).

As further shown in FIG. 5D, when the magnet wheel is at standstill and magnetic sensor 215 is providing a repeating sequence of bits, ECU 220 will detect transitions in the signal (e.g., since a sequence of repeating is requires repeated upward transitions). Conversely, a wire break would result in a constant low current level (e.g., 0 mA), as described above. Thus, the use of Manchester code for encoding the information associated with magnetic sensor 215 ensures that the current level of the signal will not be constant for a significant period of time during a sequence of repeating bits. This allows ECU 220 to distinguish between a wire break and a standstill of the magnet wheel during transmission of a sequence of repeating bits, thereby increasing functional safety of magnetic sensor 215.

Figure 5E:
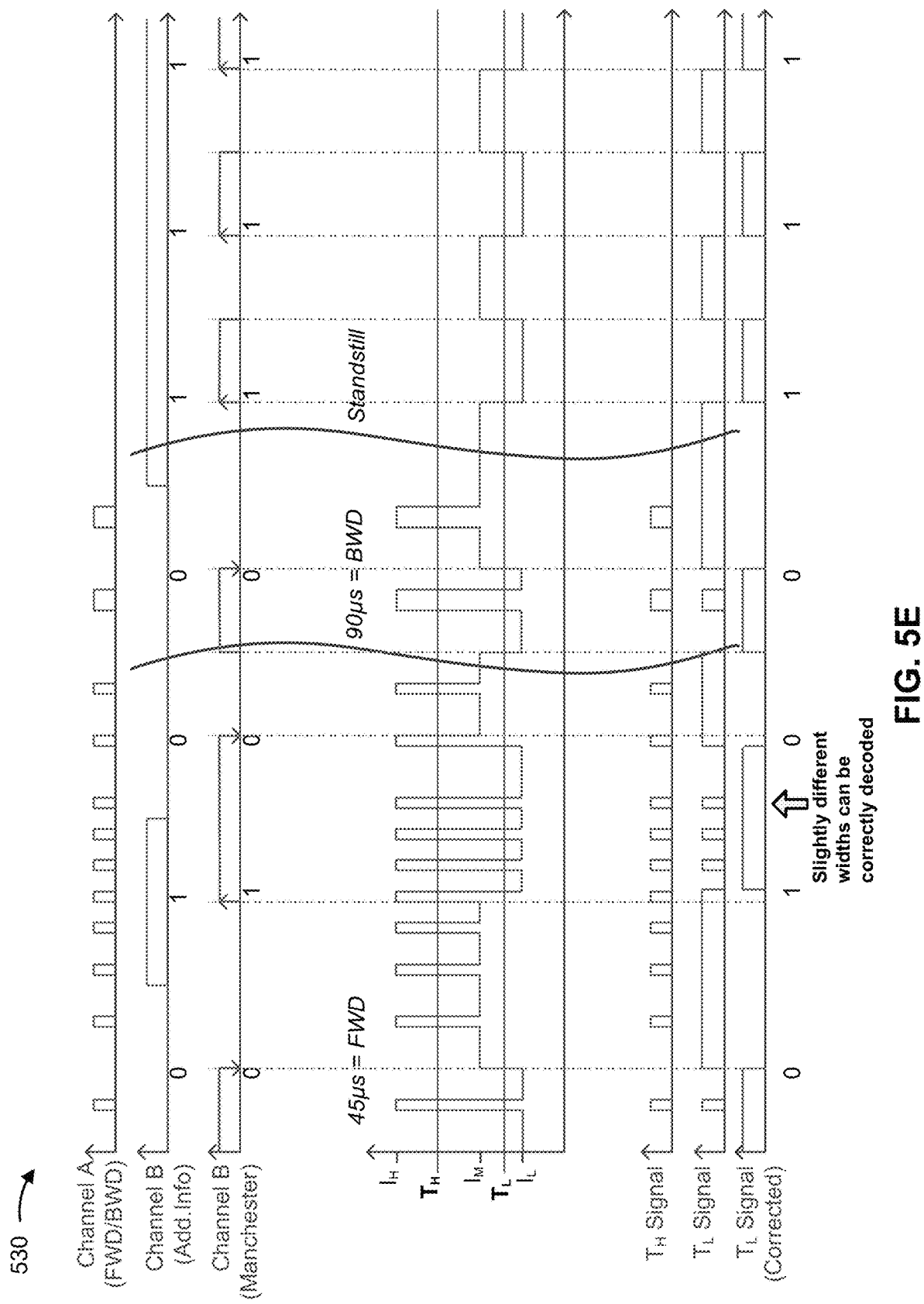

FIG. 5E is a graphical representation of another alternative pulse width modulation technique 530, associated with at least three signal levels and at least two signal thresholds, that uses Manchester code for signaling information associated with magnetic sensor 215.

As shown in the upper portion of FIG. 5E, magnetic sensor 215 may need to provide information associated with a magnet wheel (labeled as "channel A (FWD/BWD)" in FIG. 5E) and information associated with magnetic sensor 215 (labeled as "channel B (Add. Info)" in FIG. 5E). The information associated with the magnet wheel may be encoded in a manner similar to that described in association with pulse width modulation technique 500 of FIG. 5A.

As shown by the middle portion of FIG. 5E, pulse width modulation technique 530 may be associated with providing information using the at least three signal levels (e.g., $I_H$, $I_L$, $I_M$) and the at least two signal thresholds (e.g., $T_H$, and $T_L$).

In some implementations, as further shown in the middle portion of FIG. 5E, an inverse of the information associated with magnetic sensor 215 may be encoded in the signal using Manchester code. For example, as shown, the inverse of the information associated with magnetic sensor 215 (e.g., a sequence of bits including 0100111) may be encoded based on upward and downward transitions of the signal current. As a particular example, magnetic sensor 215 may transition the signal from the middle current level to the low current level (i.e., downward across the low current threshold) in order to signal a 1 bit. Similarly, magnetic sensor 215 may transition the signal from the low current level to the middle current level (i.e., upward across the low current threshold) in order to signal a 0 bit. In some implementations, inverting the information associated with magnetic sensor 215 may reduce a likelihood of error and/or simplify decoding of the information associated with magnetic sensor 215. In pulse width modulation technique 530, the information associated with magnetic sensor 215 is asynchronous with the information associated with the magnet wheel (as described above with regard to FIG. 5A).

In some implementations, ECU 220 may determine the information associated with the magnet wheel and the information associated with magnetic sensor 215 based on the at least two signal thresholds. For example, as shown in the lower portion of FIG. 5E, ECU 220 may determine the information associated with the magnet wheel based on identifying a portion of the signal from the high current threshold to the high current level (labeled as "$T_H$ signal" in the lower portion of FIG. 5E).

Continuing with this example, ECU 220 may determine the information associated with magnetic sensor 215 based on a portion of the signal from the low current threshold to the middle signal level (labeled as "$T_L$ signal" in the lower portion of FIG. 5E). However, as shown, the portion of the signal from the low current threshold to the low signal level may include pulses corresponding to the information associated with the magnet wheel. Here, ECU 220 may be configured to disregard pulses, from the low current threshold to the low signal level, with pulse widths that are less than or equal to a threshold pulse width, in a manner similar to that described above. As further shown, ECU 220 may determine the information associated with magnetic sensor 215 (labeled "$T_L$ signal (corrected)" in the lower portion of FIG. 5D) based on removing the pulses representing the information associated with the magnet wheel, inverting the remaining portion of the signal, and identifying directions of transitions in the remaining inverted portion of the signal. In some implementations, ECU 220 may be configured to disregard a transition, when an amount of time between the transition and the most recent transition is less than or equal to a threshold amount of time.

Similar to pulse width modulation technique 520, the use of Manchester code for the information associated with magnetic sensor 215 ensures that the current level of the signal will not be constant for a significant period of time during a sequence of repeating bits, which allows ECU 220 to distinguish between a wire break and a standstill of the magnet wheel with a transmission of a sequence of repeating bits, thereby increasing functional safety of magnetic sensor 215.

As further shown in the lower portion of FIG. 5E, in some cases, a pulse representing information associated with the magnet wheel may eliminate a transition representing information associated with magnetic sensor 215. Thus, as illustrated in FIG. 5E, when removing the portion of the signal representing the information associated with the magnet wheel from the portion of the signal between the low current threshold and the middle current level, a transition may appear delayed (e.g., by an amount of time up to approximately a pulse width representing a bit of information associated with the magnet wheel). Here, in order to correctly decode the information associated with magnetic sensor 215, ECU 220 may be configured to detect a transition within a transition time window, where a transition time window may be a period of time from an earliest transition time (e.g., an expected transition time minus an amount of time approximately equal to a maximum pulse width representing information associated with the magnet wheel) to a latest transition time (e.g., the expected transition time plus the amount of time approximately equal to the maximum pulse width representing the information associated with the magnet wheel). In some implementations, the expected transition time may be determined or identified based on a data rate at which ECU 220 220 is configured to receive information associated with magnetic sensor 215.

As indicated above, FIGS. 5A-5E are provided merely as examples. Other examples are possible and may differ from what was described with regard to FIGS. 5A-5E. For example, a number and/or a spacing of signal levels, a number and/or a spacing of signal thresholds, pulse widths, signal thresholds and signal levels based on which information associated with the magnet wheel is encoded in the signal and determined from the signal, signal thresholds and signal levels based on which information associated with magnetic sensor 215 is encoded in the signal and determined from the signal, and/or the like, are provided merely as examples, and other examples are possible than those described in connection with FIGS. 5A-5E.

Figure 6A:
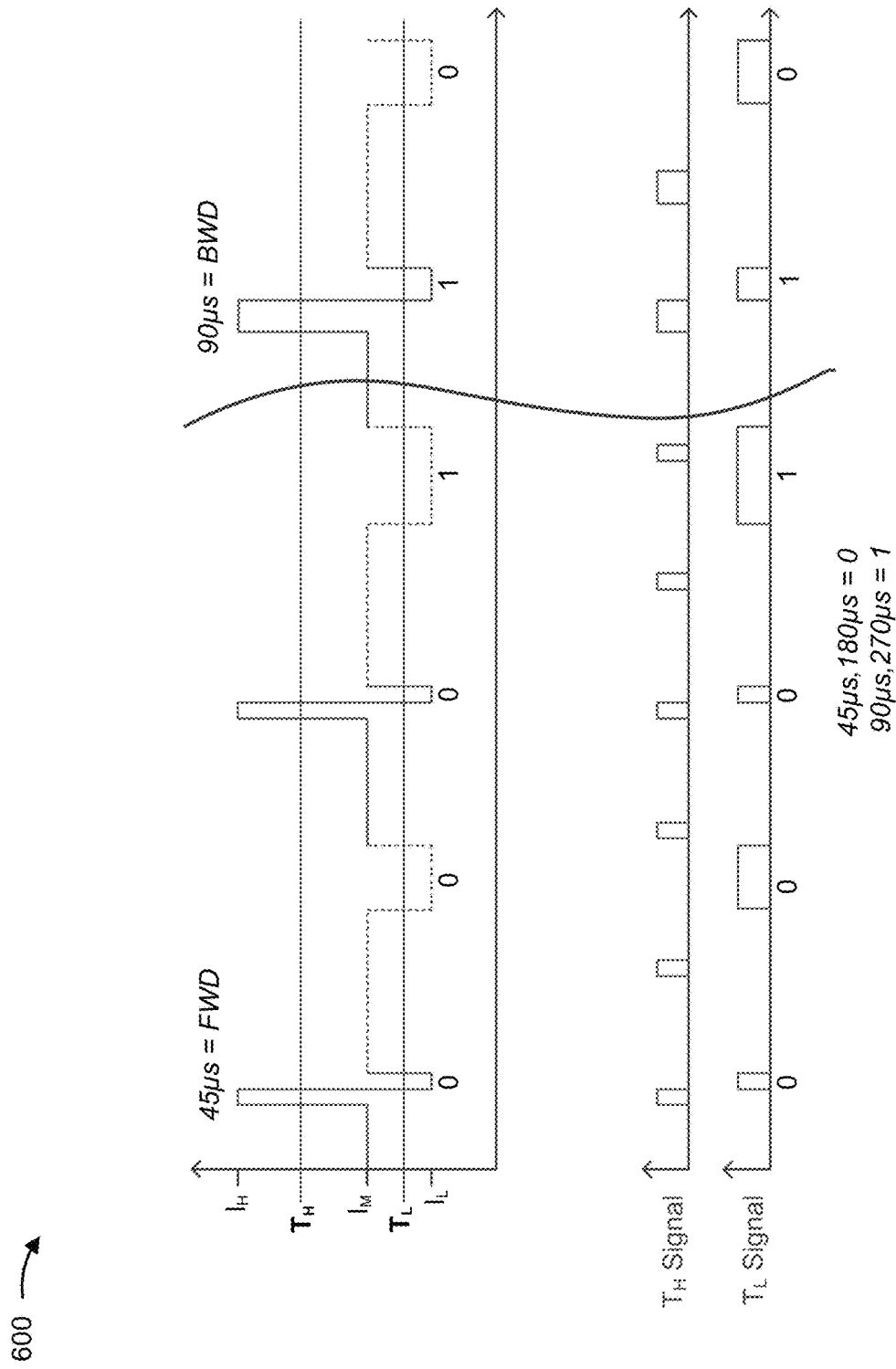
FIGS. 6A-6C are graphical representations of example implementations of pulse width modulation techniques, associated with at least three signal levels and at least two signal thresholds, used to provide an alive signal and/or information associated with a magnetic sensor in addition to information associated with a magnet wheel.
Figure 6B:
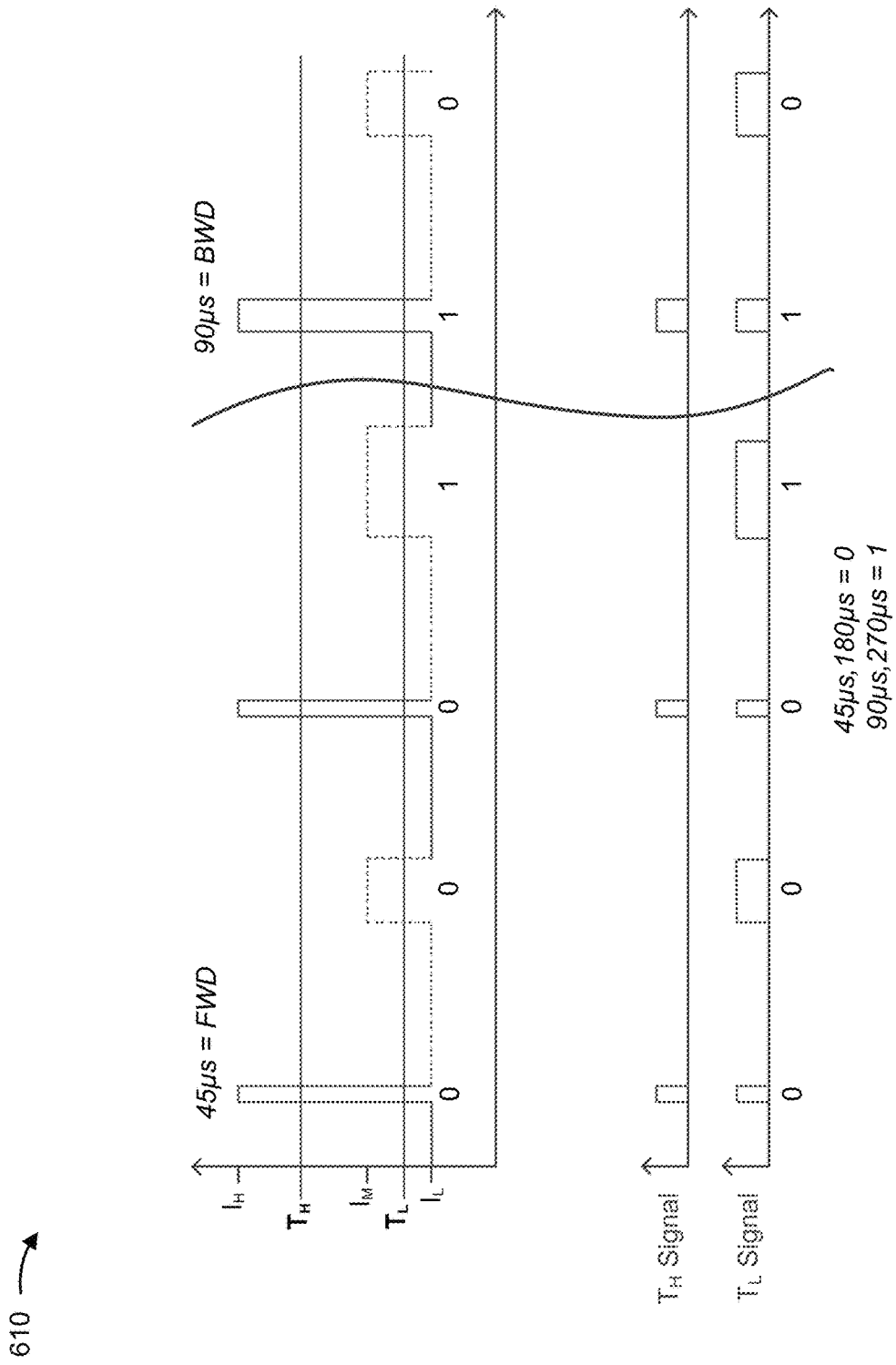
Figure 6C:
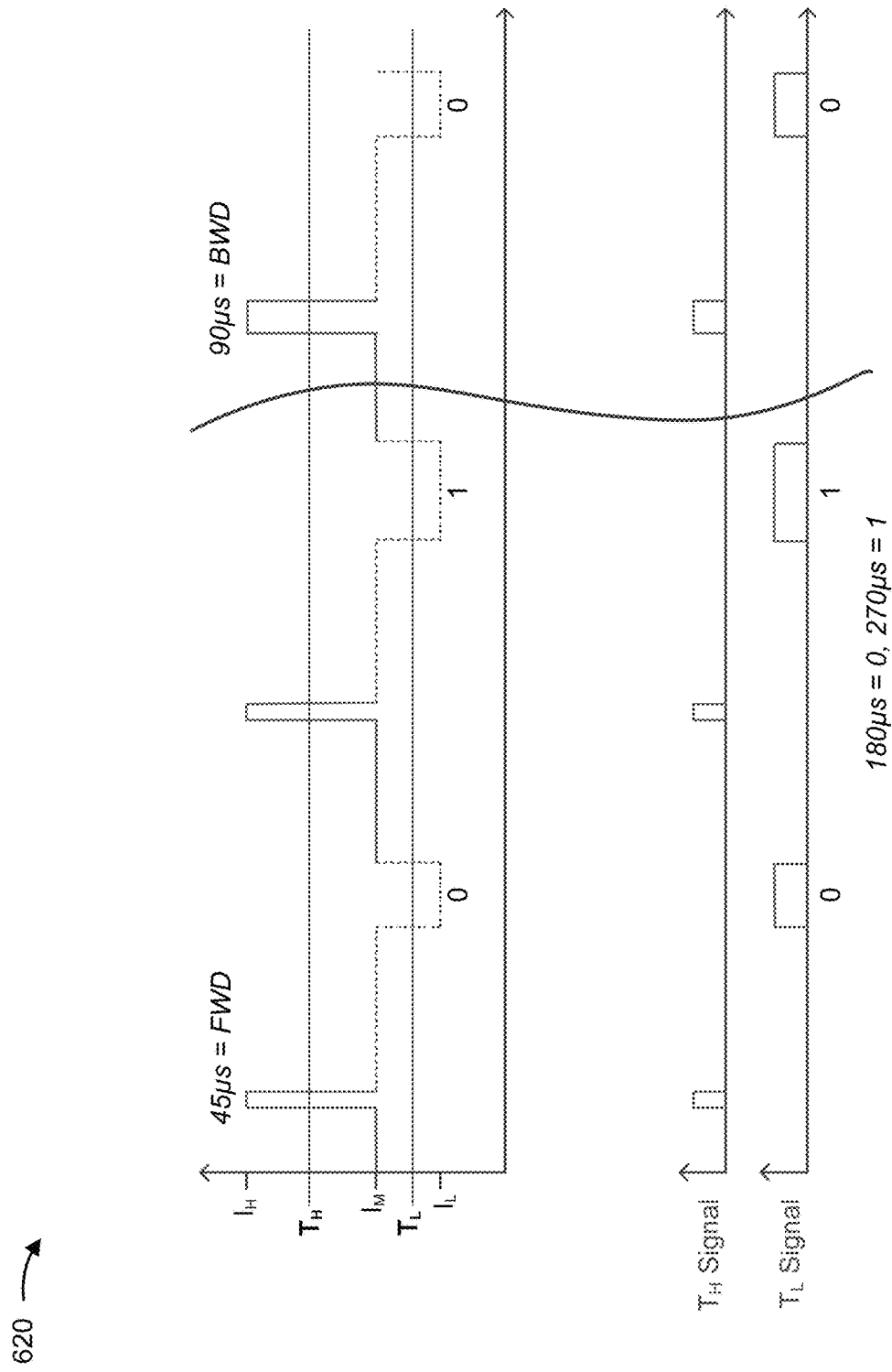

FIGS. 6A-6C are graphical representations of example implementations of pulse width modulation techniques, associated with at least three signal levels and at least two signal thresholds, used to provide an alive signal and/or information associated with a magnetic sensor in addition to information associated with a magnet wheel.

As shown in FIG. 6A, magnetic sensor 215 may implement a pulse width modulation technique 600 associated with at least three signal levels and at least two signal thresholds. As shown in the upper portion of FIG. 6A, the at least three signal levels may include a high current level ($I_H$), a low current level ($I_L$), and at least one middle current level ($I_M$), where the middle current level is between the high current level and the low current level. As further shown, the at least two signal thresholds may include a high current threshold (e.g., $T_H$, between $I_M$ and $I_H$) and a low current threshold (e.g., $T_L$, between $I_M$ and $I_L$).

In pulse width modulation technique 600, the information associated with the magnet wheel may be encoded in the signal between the high current threshold and the high current level based on the PWM protocol. For example, as shown, the information associated with the magnet wheel may be encoded in pulse widths of different lengths (e.g., a 45 microsecond (µs) indicating a forward rotation and a 90 µs pulse indicating a backward rotation, or vice versa). As further shown, information associated with magnetic sensor 215 and/or an alive signal (e.g., signaling that magnetic sensor 215 is still operational during a standstill or slow rotation of the magnet wheel) may be encoded in the signal between the low current threshold and the low signal level. For example, as shown, the information associated with magnetic sensor 215 (e.g., a sequence of bits including 000111) may be encoded in pulse widths of different lengths (e.g., shown as a 45 µs pulse and a 180 µs pulse representing a 0 bit, and a 90 µs pulse and a 270 µs representing a 1 bit—though the reverse could alternatively be used).

In some implementations, the pulse widths representing a particular bit may be of different lengths in order to indicate whether the pulse is an alive signal or is associated with a transmission of information associated with the magnet wheel. For example, magnetic sensor 215 may transmit a 0 bit using a 45 µs pulse or a 1 bit using a 90 µs pulse when the bit is transmitted based on (e.g., immediately following, without waiting for a particular period of time, without a time offset or shift, at least partially concurrently with, and/or the like) a pulse representing information associated with the magnet wheel. Conversely, magnetic sensor 215 may transmit a 0 bit using a 180 µs pulse or a 1 bit using a 270 µs pulse when the bit is transmitted during a standstill and/or after a threshold amount of time has passed since a most recent transmission of information associated with the magnet wheel (e.g., in order to indicate that magnetic sensor 215 is alive).

In pulse width modulation technique 600, the information associated with magnetic sensor 215 is synchronized with the information associated with the magnet wheel. For example, as shown, a pulse representing a bit of information associated with magnetic sensor 215 is provided based on (e.g., immediately following, without waiting for a particular period of time, without a time offset or shift, and/or the like) a pulse associated with the magnet wheel. In some implementations, the information associated with the magnetic sensor 215 may be provided based on a pulse associated with the magnet wheel and/or after a subset of pulses associated with the magnet wheel.

In some implementations, ECU 220 may determine the information associated with the magnet wheel and the information associated with magnetic sensor 215 based on the at least two signal thresholds. For example, as shown in the lower portion of FIG. 6A, ECU 220 may determine the information associated with the magnet wheel based on identifying a portion of the signal from the high current threshold to the high current level (labeled as "$T_H$ signal" in the lower portion of FIG. 6A). Similarly, ECU 220 may determine the information associated with magnetic sensor 215 based on identifying a portion of the signal from the low current threshold to the low signal level (labeled as "$T_L$ signal" in the lower portion of FIG. 6A).

FIG. 6B is a graphical representation of an alternative pulse width modulation technique 610 associated with at least three signal levels and at least two signal thresholds. As shown in the upper portion of FIG. 6B, pulse width modulation technique 610 may be associated with the at least three signal levels (e.g., $I_H$, $I_L$, $I_M$) and the at least two signal thresholds (e.g., $T_H$, and $T_L$). The information associated with the magnet wheel may be encoded in a manner similar to that described in association with pulse width modulation technique 600 of FIG. 6A.

As further shown in the upper portion of FIG. 6B, information associated with magnetic sensor 215 and/or an alive signal may be encoded in the signal between the low current threshold and the middle signal level. For example, as shown, the information associated with magnetic sensor 215 and/or the alive signal (e.g., a sequence of bits including 000110) may be encoded in pulse widths of different lengths (e.g., a 45 μs and a pulse 180 μs pulse representing a 0 bit, and a 90 μs pulse representing a 1 bit). In some implementations, the pulse widths representing a particular bit may be of different lengths in order to indicate whether the pulse is an alive signal or is associated with a transmission of information associated with the magnet wheel, as described above with regard to FIG. 6A. In pulse width modulation technique 610, the information associated with magnetic sensor 215 is synchronized with the information associated with the magnet wheel, as described above. For example, as shown, a pulse representing a bit of information associated with magnetic sensor 215 is provided based on (e.g., at least partially concurrently with or after a threshold amount of time) a pulse associated with the magnet wheel.

In some implementations, ECU 220 may determine the information associated with the magnet wheel and the information associated with magnetic sensor 215 based on the at least two signal thresholds. For example, as shown in the lower portion of FIG. 6B, ECU 220 may determine the information associated with the magnet wheel based on identifying a portion of the signal from the high current threshold to the high signal level (labeled as "$T_H$ signal" in the lower portion of FIG. 6B). Similarly, ECU 220 may determine the information associated with magnetic sensor 215 based on identifying a portion of the signal from the low current threshold to the middle signal level (labeled as "$T_L$ signal" in the lower portion of FIG. 6B).

FIG. 6C is a graphical representation of an alternative pulse width modulation technique 620 associated with at least three signal levels and at least two signal thresholds. As shown in the upper portion of FIG. 6C, pulse width modulation technique 620 may be associated with the at least three signal levels (e.g., $I_H$, $I_L$, $I_M$) and the at least two signal thresholds (e.g., $T_H$, and $T_L$). The information associated with the magnet wheel may be encoded in a manner similar to that described in association with pulse width modulation technique 600 of FIG. 6A.

As further shown in the upper portion of FIG. 6C, information associated with magnetic sensor 215 may be encoded in the signal between the low current threshold and the middle signal level in a manner similar to that described above. Notably, when implementing pulse width modulation technique 620, magnetic sensor 215 provides information associated with magnetic sensor 215 and/or an alive signal only after a threshold amount of time has passed since a most recent pulse representing information associated with the magnet wheel.

In some implementations, ECU 220 may determine the information associated with the magnet wheel and the information associated with magnetic sensor 215 based on the at least two signal thresholds. For example, as shown in the lower portion of FIG. 6C, ECU 220 may determine the information associated with the magnet wheel based on identifying a portion of the signal from the high current threshold to the high signal level (labeled as "$T_H$ signal" in the lower portion of FIG. 6C). Similarly, ECU 220 may determine the information associated with magnetic sensor 215 and/or the alive signal based on identifying a portion of the signal from the low current threshold to the low signal level (labeled as "$T_L$ signal" in the lower portion of FIG. 6C).

As indicated above, FIGS. 6A-6C are provided merely as examples. Other examples are possible and may differ from what was described with regard to FIGS. 6A-6C. For example, a number and/or a spacing of signal levels, a number and/or a spacing of signal thresholds, pulse widths, signal thresholds and signal levels based on which information associated with the magnet wheel is encoded in the signal and determined from the signal, signal thresholds and signal levels based on which information associated with magnetic sensor 215 is encoded in the signal and determined from the signal, and/or the like, are provided merely as examples, and other examples are possible than those described in connection with FIGS. 6A-6C.

Figure 7:
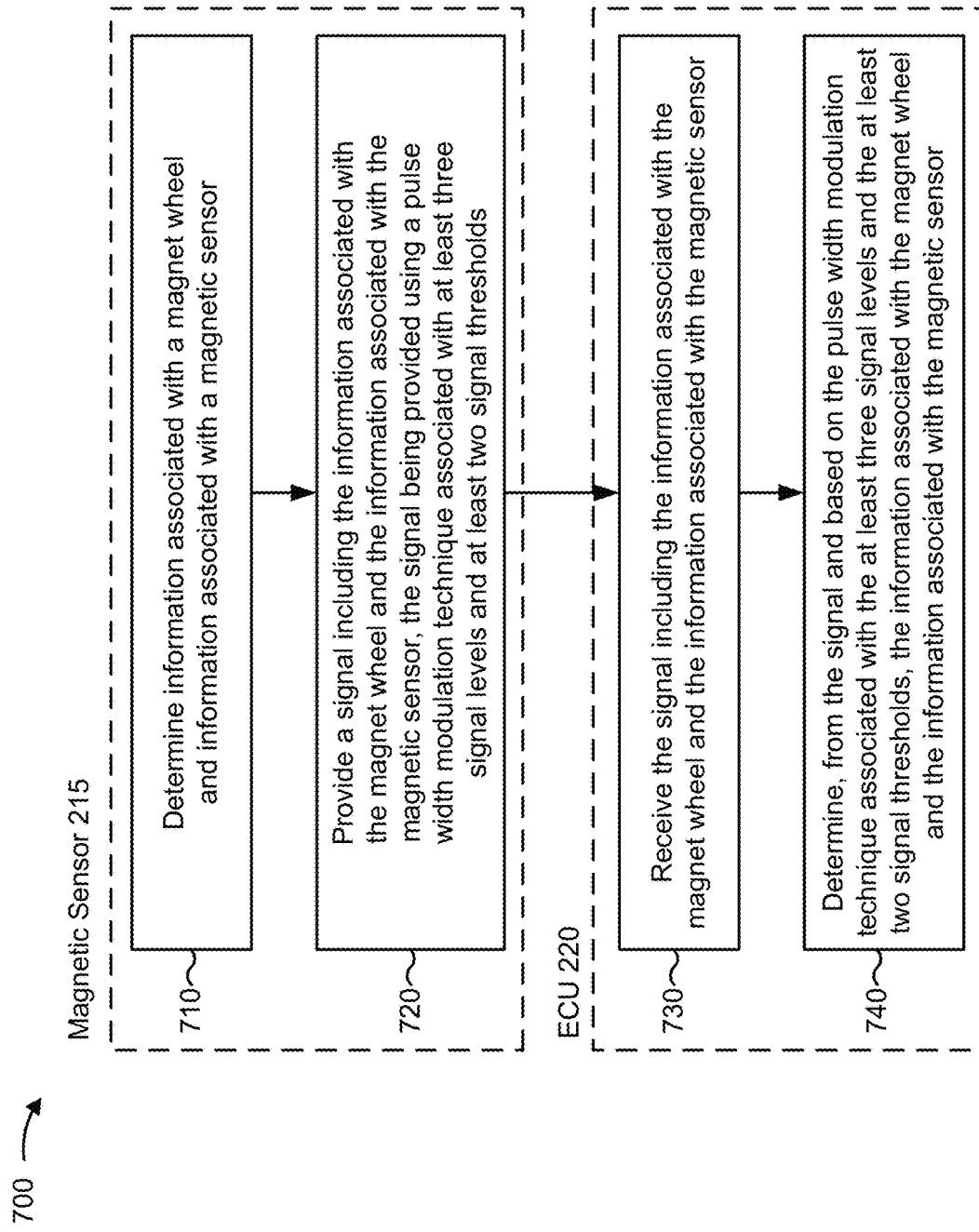
FIG. 7 is a flow chart of an example process for providing a signal including information associated with a magnet wheel and information associated with a magnetic sensor based on a pulse width modulation technique associated with at least three signal levels and at least two signal thresholds, and determining the information associated with the magnet wheel and the information associated with magnetic sensor based on the pulse width modulation technique.

FIG. 7 is a flow chart of an example process 700 for providing a signal including information associated with a magnet wheel and information associated with a magnetic sensor based on a pulse width modulation technique associated with at least three signal levels and at least two signal thresholds, and determining the information associated with the magnet wheel and the information associated with magnetic sensor based on the pulse width modulation technique. In some implementations, one or more process blocks of FIG. 7 may be performed by magnetic sensor 215 and ECU 220.

As shown in FIG. 7, process 700 may include determining information associated with a magnet wheel and information associated with a magnetic sensor (block 710). For example, magnetic sensor 215 may determine information associated with the magnet wheel and information associated with magnetic sensor 215, as described above.

As further shown in FIG. 7, process 700 may include providing a signal including the information associated with the magnet wheel and the information associated with the magnetic sensor, the signal being provided using a pulse width modulation technique associated with at least three signal levels and at least two signal thresholds (block 720). For example, magnetic sensor 215 may provide a signal including the information associated with the magnet wheel and the information associated with magnetic sensor 215, the signal being provided using a pulse width modulation technique associated with at least three signal levels and at least two signal thresholds, as described above.

As further shown in FIG. 7, process 700 may include receiving the signal including the information associated with the magnet wheel and the information associated with the magnetic sensor (block 730). For example, ECU 220 may receive the signal including the information associated with the magnet wheel and the information associated with magnetic sensor 215, as described above.

As further shown in FIG. 7, process 700 may include determining, from the signal and based on the pulse width modulation technique associated with the at least three signal levels and the at least two signal thresholds, the information associated with the magnet wheel and the information associated with the magnetic sensor (block 740). For example, ECU 220 may determine, from the signal and based on the pulse width modulation technique associated with the at least three signal levels and the at least two signal thresholds, the information associated with the magnet wheel and the information associated with magnetic sensor 215, as described above.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Implementations described herein provide a magnetic sensor that uses a pulse width modulation technique associated with at least three signal levels and at least two signal thresholds in order to allow information associated with a magnet wheel (e.g., information associated with a rotational direction, a rotational speed, and/or the like) and information associated with a magnetic sensor (e.g., functional safety information) to be included in a single signal and decoded by an ECU. The pulse width modulation technique described herein can be made entirely compatible with the PWM protocol, thereby eliminating a need to modify software, associated with the PWM protocol, configured on the ECU.

The foregoing disclosure provides illustration and description, but is not intended to be exhaustive or to limit the implementations to the precise form disclosed. Modifications and variations are possible in light of the above disclosure or may be acquired from practice of the implementations. For example, while the pulse width modulation techniques described herein are described in association with a magnetic sensor system, other implementations are possible. For example, these pulse width modulation techniques may be implemented in an optical sensor system or another type of sensor system associated with providing and decoding a signal that carries information associated with a rotating wheel.

As another example, in some implementations, the low signal threshold may be compatible with the PWM protocol, while the high signal threshold may be associated with providing information associated with a magnetic sensor and/or an alive pulse.

As an additional example, in some implementations, three or more signal thresholds may be used to deliver three or more corresponding different streams of information (e.g., using different pulse protocols) in a single signal.

As another example, in some implementations, pulse widths representing the information associated with the magnet wheel (e.g., pulse widths associated with the high signal threshold) may be independent of a rotational direction of the magnet wheel, and such information associated with the rotational direction may be encoded in the information associated with the magnetic sensor (e.g., in pulse widths associated with the low signal threshold).

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A magnetic sensor, comprising:
  one or more sensor components to:
    determine information associated with a magnet wheel,
      where the information associated with the magnet wheel is associated with at least one of a rotational speed of the magnet wheel or a rotational direction of the magnet wheel;
    determine information associated with the magnetic sensor,
      where the information associated with the magnetic sensor is associated with one or more properties of the magnetic sensor; and
    provide a signal including the information associated with the magnet wheel and the information associated with the magnetic sensor,
      where the signal is provided using a pulse width modulation technique associated with at least three signal levels and at least two signal thresholds,
      where the at least three signal levels comprise at least a first signal level, a second signal level, and a third signal level,
        the first signal level being higher than the second signal level, and
        the second signal level being higher than the third signal level,
      where the at least two signal thresholds comprise at least a first signal threshold and a second signal threshold,
        the first signal threshold being between the first signal level and the second signal level, and
        the second signal threshold being between the second signal level and the third signal level,
      where the information associated with the magnet wheel is encoded in the signal between the first signal level and the first signal threshold, and
      where the information associated with the magnet sensor is encoded in the signal between the third signal level and the second signal threshold.

2. The magnetic sensor of claim 1, where the information associated with the magnetic sensor is provided such that the information associated with the magnetic sensor is asynchronous with the information associated with the magnet wheel.

3. The magnetic sensor of claim 1, where the information associated with the magnet wheel is provided in accordance with a pulse width modulation (PWM) protocol.

4. The magnetic sensor of claim 1, where the information associated with the magnetic sensor is provided in the signal using Manchester code.

5. The magnetic sensor of claim 1, where the information associated with the magnetic sensor includes a signal indicating whether the magnetic sensor is operational.

6. The magnetic sensor of claim 1, where the one or more sensor components, when providing the signal, are to:
  provide the signal to an electronic control unit (ECU).

7. The magnetic sensor of claim 1, where further information associated with magnetic sensor is encoded in the signal between the second signal level and the second signal threshold.

8. A system, comprising:
  a sensor to:

determine information, associated with a wheel, that includes information associated with at least one of a rotational speed of the wheel or a rotational direction of the wheel;

determine information, associated with the sensor, that includes information associated with one or more properties of the sensor; and provide a signal, including the information associated with the wheel and the information associated with the sensor, based on a pulse width modulation technique associated with three or more signal levels and two or more signal thresholds, where the three or more signal levels comprise at least a first signal level, a second signal level, and a third signal level, the first signal level being higher than the second signal level, and the second signal level being higher than the third signal level, where the two or more signal thresholds comprise at least a first signal threshold and a second signal threshold, the first signal threshold being between the first signal level and the second signal level, and the second signal threshold being between the second signal level and the third signal level, where the information associated with the wheel is encoded in the signal between the first signal level, and the first signal threshold, and where the information associated with the sensor is encoded in the signal between the third signal level and the second signal threshold.

9. The system of claim 8, where the information associated with the sensor is provided in the signal such that the information associated with the sensor is asynchronous with the information associated with the wheel.

10. The system of claim 8, where the information associated with the sensor is provided such that the information associated with the sensor is inverted within the signal.

11. The system of claim 8, where the information associated with the wheel is provided in accordance with a pulse width modulation (PWM) protocol.

12. The system of claim 8, where the information associated with the sensor is provided in the signal using Manchester code.

13. The system of claim 8, where the information associated with the sensor includes an alive signal associated with the sensor.

14. The system of claim 8, further comprising an electronic control unit to:

receive the signal including the information associated with the wheel and the information associated with the sensor; and determine, based on the three or more signal levels and the two or more signal thresholds, the information associated with the wheel and the information associated with the sensor.

15. A method, comprising:

determining, by a sensor, information associated with a wheel, where the information associated with the wheel is associated with at least one of a rotational speed of the wheel or a rotational direction of the wheel;

determining, by the sensor, information associated with the sensor, where the information associated with the sensor is associated with one or more properties the sensor; and providing, by the sensor, a signal including the information associated with the wheel and the information associated with the sensor, where the signal is provided based on a modulation technique associated with at least three signal levels and at least two signal thresholds, where the at least three signal levels comprise at least a first signal level, a second signal level, and a third signal level, the first signal level being higher than the second signal level, and the second signal level being higher than the third signal level, where the at least two signal thresholds comprise at least a first signal threshold and a second signal threshold, the first signal threshold being between the first signal level and the second signal level, and the second signal threshold being between the second signal level and the third signal level, where the information associated with the wheel is encoded in the signal between the first signal level and the first signal threshold, where the information associated with the sensor is encoded in the signal between the third signal level and the second signal threshold, and where the signal is provided to an electronic control unit (ECU) in order to permit the ECU to determine, based on the signal, the information associated with the wheel and the information associated with the sensor.

16. The method of claim 15, where the information associated with the sensor is provided such that the information associated with the sensor is synchronous with the information associated with the wheel.

17. The method of claim 15, where the information associated with the wheel is provided in accordance with a pulse width modulation (PWM) protocol.

18. The method of claim 15, where the information associated with the sensor is provided in the signal using Manchester code.

19. The method of claim 15, where the information associated with the sensor includes a signal indicating that the sensor is operational.

20. The method of claim 15, where the information associated with the sensor comprises at least one of:

information associated with a temperature of the sensor, information associated with an amplitude value of a speed and direction signal, information associated with an error experienced by the sensor, an alive signal associated with the sensor, or functional safety information.

* * * * *